US010803471B2

(12) United States Patent
Weinstein et al.

(10) Patent No.: US 10,803,471 B2
(45) Date of Patent: Oct. 13, 2020

(54) AUDIENCE SIZE ESTIMATION AND COMPLEX SEGMENT LOGIC

(71) Applicant: Adobe Inc., San Jose, CA (US)

(72) Inventors: David M. Weinstein, Rockville Centre, NY (US); Matvey Kapilevich, New York, NY (US); Harleen S. Sahni, Astoria, NY (US); Margarita R. Savova, Jersey City, NJ (US); Nicholas M. Jordan, Brooklyn, NY (US); David A. Jared, Denver, CO (US)

(73) Assignee: Adobe Inc., San Jose, CA (US)

( * ) Notice: Subject to any disclaimer, the term of this patent is extended or adjusted under 35 U.S.C. 154(b) by 295 days.

(21) Appl. No.: 13/629,330

(22) Filed: Sep. 27, 2012

(65) Prior Publication Data

US 2014/0089043 A1 Mar. 27, 2014

(51) Int. Cl.
*G06Q 10/10* (2012.01)
*G06Q 30/02* (2012.01)

(52) U.S. Cl.
CPC .................. *G06Q 30/02* (2013.01)

(58) Field of Classification Search
CPC ........ G06Q 10/06; G06Q 10/10; G06Q 30/02; G06F 17/30
USPC .......... 705/7, 10, 14, 7.31, 7.33, 14.49, 7.29
See application file for complete search history.

(56) References Cited

U.S. PATENT DOCUMENTS

| | | | | |
|---|---|---|---|---|
| 6,839,680 | B1 * | 1/2005 | Liu et al. | ..................... 705/7.33 |
| 7,693,863 | B2 | 4/2010 | Martin et al. | |
| 7,882,054 | B2 | 2/2011 | Levitan | |
| 8,527,342 | B2 * | 9/2013 | Feuerstein et al. | ......... 705/14.42 |
| 8,554,602 | B1 * | 10/2013 | Zohar et al. | .................. 705/7.33 |
| 8,655,695 | B1 * | 2/2014 | Qu et al. | ...................... 705/7.11 |
| 2002/0161629 | A1 * | 10/2002 | Jentoft | ............................ 705/14 |
| 2005/0165643 | A1 | 7/2005 | Wilson | |
| 2005/0166233 | A1 | 7/2005 | Beyda et al. | |
| 2005/0246659 | A1 | 11/2005 | Mengerink et al. | |
| 2005/0246736 | A1 | 11/2005 | Beyda et al. | |

(Continued)

OTHER PUBLICATIONS

Christina Park "Backblaze and SurveyMonkey Are First Cloud-Based Storage and Online Subscription Services to Advertise on Facebook Exchange" Triggit Blog www.triggit.com Sep. 17, 2012 pp. 1-5.

(Continued)

*Primary Examiner* — Nga B Nguyen
(74) *Attorney, Agent, or Firm* — Kilpatrick Townsend & Stockton LLP

(57) ABSTRACT

Selection of a trait may be received. A complex segment rule may be created that is usable to evaluate one or more qualification events. For example, the segment rule may be usable to evaluate a combined recency and frequency of the one or more qualification events. The qualification events may be based on collected network data associated with the plurality of visitors with each qualification event corresponding to a separate qualification of visitor according to the trait. The qualification events may be evaluated together according to the segment rule. For example, the combined recency and frequency of the one or more qualification events may be evaluated according to the segment rule. Evaluating the segment rule may include estimating a segment population size in real-time.

20 Claims, 18 Drawing Sheets

(56) References Cited

U.S. PATENT DOCUMENTS

| | | | |
|---|---|---|---|
| 2006/0224456 A1* | 10/2006 | Walker | G06Q 30/02 |
| | | | 705/14.1 |
| 2008/0183806 A1* | 7/2008 | Cancel | G06Q 30/02 |
| | | | 709/203 |
| 2008/0222283 A1* | 9/2008 | Ertugrul et al. | 709/224 |
| 2008/0262920 A1* | 10/2008 | O'Neill et al. | 705/14 |
| 2008/0275785 A1 | 11/2008 | Altberg et al. | |
| 2009/0025024 A1* | 1/2009 | Beser | G06Q 30/0273 |
| | | | 725/12 |
| 2009/0133058 A1 | 5/2009 | Kouritzin et al. | |
| 2009/0192869 A1* | 7/2009 | Irvine et al. | 705/10 |
| 2009/0198507 A1 | 8/2009 | Rhodus | |
| 2010/0042403 A1 | 2/2010 | Chandrasekar et al. | |
| 2010/0042419 A1 | 2/2010 | Pritchard et al. | |
| 2010/0042465 A1 | 2/2010 | Pritchard et al. | |
| 2010/0088177 A1 | 4/2010 | Lu et al. | |
| 2010/0211464 A1 | 8/2010 | Zhu et al. | |
| 2010/0217665 A1 | 8/2010 | Sharma | |
| 2011/0184813 A1 | 7/2011 | Barnes et al. | |
| 2011/0246511 A1* | 10/2011 | Smith et al. | 707/769 |
| 2011/0302028 A1 | 12/2011 | Swenson | |
| 2011/0307331 A1* | 12/2011 | Richard | G06Q 30/00 |
| | | | 705/14.45 |
| 2012/0042013 A1* | 2/2012 | Roman | G06Q 10/10 |
| | | | 709/204 |
| 2012/0047005 A1* | 2/2012 | Connelly | G06Q 30/0241 |
| | | | 705/14.4 |
| 2012/0047013 A1* | 2/2012 | Bigby | G06Q 30/02 |
| | | | 705/14.52 |
| 2012/0116876 A1 | 5/2012 | Graham, Jr. | |
| 2012/0204204 A1 | 8/2012 | Kouritzin et al. | |
| 2012/0331098 A1* | 12/2012 | Ertugrul et al. | 709/217 |

OTHER PUBLICATIONS

"Ad Viewability" http://adsafemedia.com/ad-viewability adsafe.com pp. 1-3 NYC 2009-2012 AdSafe Media, LLC.

"How remarketing works" https://support.google.com/adxbuyer/bin/answer.py?hl=en&answer=166635 downloaded from the internet on Oct. 11, 2012 pp. 1-2.

Caroline Watts "An Intermediate Retargeting Primer: How Psychographic Targeting and Retrageting Can Work Together" http://www.seomoz.org/ugc/an-intermediate-retargeting-primer-how-psychographic-targeting-and-retargeting-can-work-together, Sep. 25, 2012 pp. 1-8.

"The Arrival of Real-Time Bidding and What it Means for Media Buyers" whitepaper, http://static.googleusercontent.com/external_content/untrusted_dlcp/www.google.com/en/us/doubleclick/pdfs/Google-White-Paper-The-Arrival-of-Real-Time-Bidding-July-2011.pdf pp. 1-18 Google 2011.

U.S. Appl. No. 13/653,232, filed Oct. 16, 2012, David M. Weinstein, et al.

Google, "The Arrival of Real-Time Bidding and What it Means for Media Buyers," 2001 Google, Inc., downloaded from http://static.googleusercontent.com/external_content/untrusted_dlcp/www.google.com/en/us/doubleclick/pdfs/Google-White-Paper-The-Arrival-of-Real-Time-Bidding-July-2011.pdf, pp. 1-18.

Triggit, Inc., "Backblaze and SurveyMonkey Are First Cloud-Based Storage and Online Subscription Services to Advertise on Facebook Exchange," http://triggit.com/faq, pp. 1-10, Sep. 16, 2012.

Adsafe, "Ad Viewability metrics," downloaded from http://adsafemedia.com/ad-viewability, Made in NYC. © 2009-2012 AdSafe Media, LLC. All rights reserved, pp. 1-3.

Doubleclick by Google, "DoubleClick Ad Exchange: How Remarketing Works," https://support.google.com/adxbuyer/bin/answer.py?hl=en&answer=166635, 2012, pp. 1-4, Jul. 26, 2012.

Caroline Watts, "An Intermediate Retargeting Primer: How Psychographic Targeting and Retrageting Can Work Together," downloaded from http://www.seomoz.org/ugc/an-intermediate-retargeting-primer-how-psychographic-targeting-and-retargeting-can-work-together, Sep. 26, 2012, pp. 1-8.

Final Office Action issued in U.S. Appl. No. 13/653,232 dated Jan. 5, 2016.

First Action (without interview), First Action Interview Office Action issued in U.S. Appl. No. 13/653,232 dated Jul. 24, 2015.

Preinterview First Office Action issued in U.S. Appl. No. 13/653,232 dated Apr. 9, 2015.

U.S. Appl. No. 13/653,232, "Final Office Action", dated Nov. 9, 2017, 32 pages.

U.S. Appl. No. 13/653,232, Non-Final Office Action dated Mar. 9, 2017, 22 pages.

* cited by examiner

FIG. 7

Segments

| | Segment Storage 704 | | |
|---|---|---|---|
| | Q Search All Segments | | |
| | All Segments 706 | | |
| | ☐ Folder Name | | |
| | ☐ Folder Name | | |
| | ☐ Folder Name | | |
| | ☐ Folder Name | | |
| | Folder Name | | |
| | Folder Name | | |
| | ☐ Folder Name | | |

Navigation (left panel):
- ANALYTICS
  - General Reports
  - Trend Reports
  - Custom Reports
- MANAGE DATA
  - Traits
  - Segments
  - Destinations
  - Models
- KNOWLEDGE BASE
  - Topic Root
  - Topic Root
  - Topic Root
  - Topic Root Top toolbar: + Create a New Segment | + Add Selected to Destination | + Create Model with Selected | X Delete Selected | 1 | 702

708

| ☐ | ID | Name | Description | Status | Actions |
|---|---|---|---|---|---|
| ☐ | 80987 | High-End Camera Shopper | Segment description lorem ipsum | Active | ✎ ⊙ ☐ ✕ 714 |
| ☐ | 80987 | High-End Camera Shopper | Segment description lorem ipsum | Active | |
| ☐ | 80987 | High-End Camera Shopper | Segment description lorem ipsum | Inactive | |
| ☐ | 80987 | High-End Camera Shopper | Segment description lorem ipsum | Active | |
| ☑ | 80987 | High-End Camera S 710 | Segment description lorem ipsum | Active | |
| ☐ | 80987 | High-End Camera Shopper | Segment description lorem ipsum *(Full Segment Description 712)* | Inactive | |
| ☐ | 80987 | High-End Camera Shopper | Segment descrip... | Active | |
| ☐ | 80987 | High-End Camera Shopper | Segment descrip... | Active | |
| ☐ | 80987 | High-End Camera Shopper | Segment description lorem ipsum | Active | |
| ☐ | 80987 | High-End Camera Shopper | Segment description lorem ipsum | Active | |
| ☑ | 80987 | High-End Camera Shopper | Segment description lorem ipsum | Inactive | |
| ☐ | 80987 | High-End Camera Shopper | Segment description lorem ipsum | Active | |
| ☐ | 80987 | High-End Camera Shopper | Segment description lorem ipsum | Active | |

Showing 1-50 of 1000 Segments

◀ First Page ◀ Previous Page　　1 2 3 4 5　　Next Page ▶ Last Page ▶

Segment Builder

Browse All Traits

Trait Storage  *1002*

Search All Traits 🔍

All Traits  *1004*
- ☐ Folder Name
  - ☐ Folder Name
  - ☐ Folder Name
- ☐ Folder Name
- ☐ Folder Name
- ☐ Folder Name

| ☐ | ID | Name | ↓ Type | Type | Data Source | 7-Day Uniques | 30-Day Uniques | 60-Day Uniques |
|---|----|------|--------|------|-------------|---------------|----------------|----------------|
| ☐ | 80987 | 18-24 Years | Type | Type | TargusInfo | 150,000 | 500,000 | 900,000 |
| ☐ | 80987 | 18-24 Years | Type | Type | Demdex | 150,000 | 500,000 | 900,000 |
| ☐ | 80987 | 18-24 Years | Type | Type | Demdex | 150,000 | 500,000 | 900,000 |
| ☐ | 80987 | 18-24 Years | Type | Type | TargusInfo | 150,000 | 500,000 | 900,000 |
| ☐ | 80987 | 18-24 Years | Type | Type | Demdex | 150,000 | 500,000 | 900,000 |
| ☑ | *1006* | 18-24 Years 👆*1008* | Type | Type | Demdex | 150,000 | 500,000 | 900,000 |
| ☐ | 80987 | 18-2 Full Trait | pe | Type | TargusInfo | 150,000 | 500,000 | 900,000 |
| ☐ | 80987 | 24-3 Description | pe | Type | Demdex | 150,000 | 500,000 | 900,000 |
| ☑ | 80987 | 18-2 | Type | Type | TargusInfo | 150,000 | 500,000 | 900,000 |
| ☐ | 80987 | 18-24 Years | Type | Type | Demdex | 150,000 | 500,000 | 900,000 |
| ☐ | 80987 | 18-24 Years | Type | Type | TargusInfo | 150,000 | 500,000 | 900,000 |
| ☐ | 80987 | 18-24 Years | Type | Type | Demdex | 150,000 | 500,000 | 900,000 |
| ☑ | 80987 | 18-24 Years | Type | Type | TargusInfo | 150,000 | 500,000 | 900,000 |

Showing 1-50 of 1000 Traits

◄ First Page   ◄ Previous Page                    1 2 3 4 5     Next Page ►   Last Page ►

Add Selected Traits to Segment    |   Cancel   | ←*1010*

Segment Builder

» Basic Information

« Traits:

Segments Traits: | Segments Expression (Code View)

Trait Name ~1102

Basic Information

| | |
|---|---|
| Trait ID: | 85495 |
| Name: | Trait Name |
| Description: | Description lorem ipsum dolor sit |
| Type: | Trait Type |
| Data Source: | BlueKai |
| Integration Code: | Integration Code |
| Stored In: | All Traits / Folder Name / Folder Name |
| Data Category: | Data Category Name |
| 7-Day Uniques: | 150,000 |
| 30-Day Uniques: | 300,000 |
| 60-Day Uniques: | 600,000 |
| Comments: | Optional comments lorem ipsum hic tem explaccumqui tendaeptam derchit. |

« ANALYTICS
General Reports
Trend Reports
Custom Reports

« MANAGE DATA
Traits
Segments
Destinations
Models

« KNOWLEDGE BASE
Topic Root
Topic Root
Topic Root
Topic Root

+Create a New Segment | ✎Edit | ☐Clone | ✕Delete   1402

Segment Name

ANALYTICS
General Reports
Trend Reports
Custom Reports

MANAGE DATA
Traits
Segments
Destinations
Models

KNOWLEDGE BASE
Topic Root
Topic Root
Topic Root
Topic Root

Basic Information   1404

Segment ID:   865484
Name:         Segment Name
Description:  Description lorem ipsum dolor sit
Stored In:    All Segments/Folder Name/Folder Name   } 1406
Status:       Active Segment Uniques   1408

500,000
450,000
400,000
350,000
300,000
250,000
200,000
150,000
100,000
50,000
0

01/01/2011 02/01/2011 03/01/2011 04/01/2011 05/01/2011 06/01/2011 07/01/2011 08/01/2011

Traits for "Segment Name"   1410

Add a Trait
Search by Trait Name        Trait Name
                            Trait Name   1412
                                         Frequency and Recency
                                         ∧ 5 times
                                         ∨ 2 / Days ago
                            And
                            Trait Name 👆 1414
                            Trait Name 1416— Edit Segment Traits Destinations Mapping   1420

| Name             | Type | URL, Key Value Pair or ID  |
|------------------|------|----------------------------|
| Destination Name | Type | http://url.com/destination |
| Destination Name | Type | http://url.com/destination |
| Destination Name | Type | http://url.com/destination |
| Destination Name | Type | http://url.com/destination |
| Destination Name | Type | http://url.com/destination |
| Destination Name | Type | http://url.com/destination |

Edit Destinations

FIG. 15

| Segment Builder | |
|---|---|
| ▴ Basic Information ⓘ | |
| Name: | Male Jersey Shore Viewers |
| Description: | |
| Integration Code: | |
| Data Source: | MTVN (DPID: 332) |
| Status: | Active |

▴ ☐ All Segments
  ▴ ☐ AD SALES
  ▴ ☐ CRM
    ☐ VMP

▴ Traits

Basic View | Code View ⓘ

Male ........................................... Last 30 Days: 32,261,376  × ⓘ
Male ........................................... Last 30 Days: 4,369,894  ×

AND

Video-Generic Video View-Show Title-Jersey Shore .... Last 30 Days: 115,877  × ⓘ
Video-Full Episode Start-Show Title-Jersey Shore .... Last 30 Days: 47,626  ×

Add a Trait
Search by Trait                + Add Trait   ≡ Browse All Traits

Estimated Historic Segment Size ⓘ
Last 7 Days: -    Last 30 Days: -    Last 60 Days: -

Real-time Segment Population ⓘ                     Recalculate Size — 1502

ANALYTICS
 Dashboard
 General Reports
 Trend Reports
 Custom Reports
MANAGE DATA
 Traits
 Segments
 Destinations
 Derived Signals
 Tags
▸ADMIN

```
┌─────────────────────────────────────────────────────────────────────────┐
│ ◄ANALYTICS  │ Segment Builder                                    1600   │
│  Dashboard  │ ◄ Basic Information ⓘ                                     │
│  General Reports                                                        │
│  Trend Reports    Name:            [Male Jersey Shore Viewers]          │
│  Custom Reports   Description:     [                        ]           │
│ ◄MANAGE DATA      Integration Code: [                       ]           │
│  Traits           Data Source:     [MTVN (DPID: 332)    ▼]              │
│  Segments         Status:          [Active  ▼]                          │
│  Destinations                              ▲ ☐ All Segments             │
│  Derived Signals                           ▲ ☐ AD SALES                 │
│  Tags                                      ▲ ☐ CRM                      │
│ ►ADMIN                                       ☐ VMP                      │
│             │                                                           │
│             │ ◄ Traits                                                  │
│             │ [Basic View] [Code View] ⓘ                                │
│             │                                                           │
│             │ Male                    Last 30 Days: 32,261,376    × ⊖  │
│             │ Male                    Last 30 Days: 4,369,894     ×    │
│             │                                                           │
│             │                    [AND ▼]                                │
│             │                                                           │
│             │ Video-Generic Video View-Show Title-Jersey Shore          │
│             │                         Last 30 Days: 115,877       × ⊖  │
│             │ Video-Full Episode Start-Show Title-Jersey Shore          │
│             │                         Last 30 Days: 47,626        ×    │
│             │                                                           │
│             │ Add a Trait                                               │
│             │ Search by Trait   [+ Add Trait] [≡ Browse All Traits]    │
│             │                                                           │
│             │ Estimated Historic Segment Size ⓘ                         │
│             │ Last 7 Days: 14,080  Last 30 Days: 32,256  Last 60 Days: 49,024 │
│             │                                                           │
│             │ Real-time Segment Population ⓘ                            │
│             │ Last 30 Days: 35,144,576                                  │
│             │ Last 30 Days: 121,088                                     │
│             │                                       [Recalculate Size]  │
└─────────────────────────────────────────────────────────────────────────┘
```

FIG. 17

```
Segment Builder
◀ Basic Information ?
  Name:              [Complex Segment Rule]
  Description:       [                    ]
  Integration Code:  [                    ]
  Data Source:       [MTVN (DPID: 332)  ▼]
  Status:            [Active ▼]

▲ ☐ All Segments
                       ▲ ☐ AD SALES
                         ☐ CRM
                         ☐ VMP ◀ Traits ?
[Basic View | Code View ?]

(61405T OR 62727T) AND (67874T OR 71056T) AND NOT (61404T OR 61794T OR (62726T AND 63562T))      ← 1702

1704

[Validate Expression] [Reset and Return to Basic View]

Estimated Historic Segment Size ?                                              [Recalculate Size]
Last 7 Days: 11,648    Last 30 Days: 24,192    Last 60 Days: 34,304

Real-time Segment Population ?
Last 7 Days: -         Last 30 Days: -         Last 60 Days: -

Total Segment Population ?
Last 7 Days: -         Last 30 Days: -         Last 60 Days: -

▶ Destinations Mapping ?
[Save] [Cancel]
  ↑
 1706
```

Sidebar:
- ◀ ANALYTICS
  - Dashboard
  - General Reports
  - Trend Reports
  - Custom Reports
- ◀ MANAGE DATA
  - Traits
  - Segments
  - Destinations
  - Derived Signals
  - Tags
- ▶ ADMIN

*« Traits*

| Basic View | Code View |

- Video-Generic Video-Show Title-Paris Hilton's — Last 30 Days: 984   ×
- Video-Generic Video-Show Title-Web Junk — Last 30 Days: 205   ×
- Video-Generic Video-Show Title-What Perez — Last 30 Days: 65   ×
- Video-Generic Video-Show Title-The T.O. Show — Last 30 Days: 4,243   ×
- Video-Generic Video-Show Title-The Wendy — Last 30 Days: 230   ×

*Add a Trait*
Search by Trait

[ + Add Trait ] [ ≡ Browse All Traits ]

*Estimated Historic Segment Size*
Last 7 Days: 896    Last 30 Days: 4,736    Last 60 Days: 7,040

*Real-time Segment Population*
Last 7 Days: 1,341    Last 30 Days: 6,525    Last 60 Days: 9,156

*Total Segment Population*
Last 7 Days: 6,321    Last 30 Days: 8,370    Last 60 Days: 10,990

[ Recalculate Size ]

1800

AUDIENCE SIZE ESTIMATION AND COMPLEX SEGMENT LOGIC

BACKGROUND

Goods and services providers often employ various forms of marketing to drive consumer demand for products and services. Marketing includes various techniques to expose to target audiences to brands, products, services, and so forth. For example, marketing often includes providing promotions (e.g., advertisements) to an audience to encourage them to purchase a product or service. In some instances, promotions are provided through media outlets, such as television, radio, and the internet via television commercials, radio commercials and webpage advertisements. In the context of websites, marketing may include advertisements for a website and products associated with that website to encourage persons to visit and/or use the website, purchase products and services offered via the website, and/or otherwise interact with the website.

In marketing or other applications, data may be managed. User data management is the collection and analysis of user website interaction data. It includes collecting information about how individual users interact on website.

SUMMARY

Methods and apparatus for real-time audience size estimation and implementing complex segment logic are disclosed. Selection of a trait may be received with the trait being descriptive of visitors of network content (e.g., behavior exhibited, information disclosed while on the network content, etc.). A complex segment rule may be created that is usable to evaluate one or more qualification events. For example, the segment rule may be usable to evaluate a combined recency and frequency of the one or more qualification events. The qualification events may be based on collected network data associated with the plurality of website interactions. Each of the qualification events may correspond to a separate qualification of one of the visitors according to the trait. In one embodiment, the qualification events may be evaluated together according to the segment rule. For example, the combined recency and frequency of the one or more qualification events may be evaluated according to the segment rule. In one embodiment, evaluating the segment rule may include estimating a segment population size in real-time.

BRIEF DESCRIPTION OF THE DRAWINGS

FIGS. 7-18 illustrate screenshots of an example user interface for which various embodiments may be performed.

Figure 1:
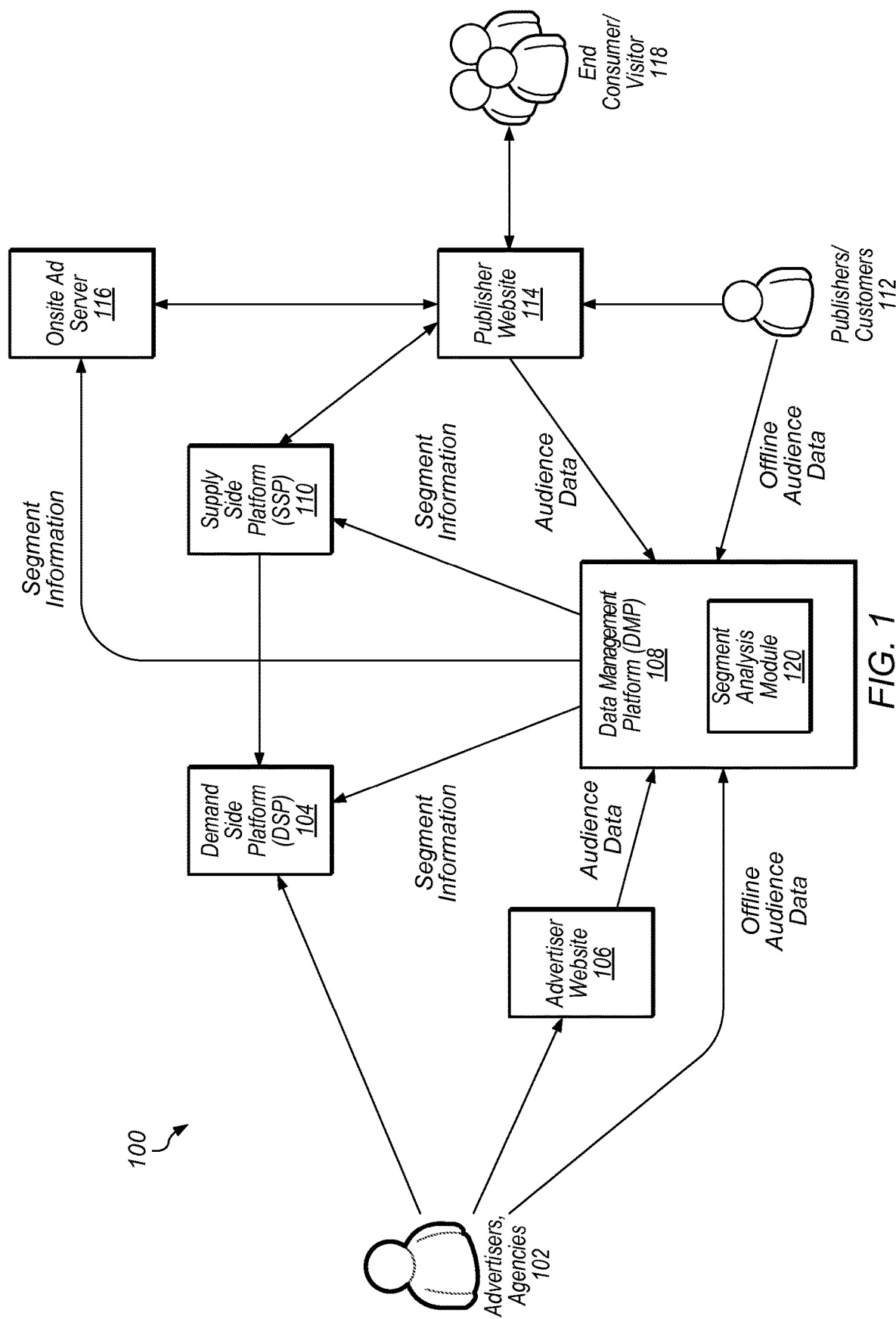
FIG. 1 illustrates an example segment analysis system configured to support real-time and back end segment qualification, real-time audience size estimation, and/or complex segment logic, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a segment analysis module evaluating the qualification of a visitor according to a segment rule that includes first and second traits, the terms "first" and "second" traits can be used to refer to any two traits that are part of the segment rule. In other words, the "first" and "second" advertisements are not limited to logical traits 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

INTRODUCTION

This specification presents an illustrative segment analysis and online advertising system, as well as multiple illustrative segment analysis modules that may implement one or more of the disclosed real-time and back end (also referred to as processed) segment qualification techniques as well as audience size estimation and/or complex segment logic techniques. The specification then discloses techniques for performing real-time and back end segment qualification, audience size estimation, and/or implementing complex segment logic. Various examples and applications are disclosed. Some of these techniques may be implemented, for example, by a segment analysis module or computer system.

While much of the specification is described in terms of online marketing, similar techniques may apply in customer segmentation, content customization, and/or variable pricing of products.

Some embodiments may include a means for real-time and back end segment qualification and/or a means for audience size estimation and/or a means for implementing complex segment logic shared between back end and real-time systems. For example, a segment analysis module (e.g., segment analysis module 120/218/313 of FIGS. 1/2/3) may determine that a visitor qualifies in a segment (by a real-time component, back end component, or both) and, in one embodiment, store an indication of the visitor's segment qualification in the real-time component, as described herein. As another example, the segment analysis module may receive selection of one or more traits or pixel qualification, create a segment rule that is usable to evaluate a combined recency and frequency of one or more qualification events, and evaluate the combined recency and frequency of the qualification events according to the segment rule. The segment analysis module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform determining that a visitor qualifies in a segment (by a real-time component, back end component, or both) and storing an indication of the visitor's segment qualification in the real-time component, as described herein. The computer-readable storage medium may store program instructions executable by the one or more processors to cause the computing apparatus to perform receiving selection of a trait, creating a segment rule that is usable to evaluate a combined recency and frequency of one or more qualification events, and evaluating the combined recency and frequency of the qualification events according to the segment rule. Other embodiments of the segment analysis module may be at least partially implemented by hardware circuitry and/or firmware stored, for example, in a non-volatile memory.

In some embodiments, these techniques may be used in measuring the size of a segment audience, and in qualifying visitors in a segment. The segment audience size and visitor qualifications can then be used in an advertising campaign, email campaign, content customization, or for analytics purposes, among other example applications. Although certain embodiments and applications are described in terms of segment qualification, audience size estimation, and online advertising, it should be noted that the same or similar principles may be applied in other fields.

Moreover, although certain embodiments are described with respect to a webpage and/or website, it will be appreciated that the techniques disclosed herein may be employed with other forms of network content sites, such as documents with a traversable tree-like hierarchy (e.g., XML, HTML, etc.).

Turning now to the figures, FIG. 1 illustrates an example segment analysis system 100 configured to support real-time and back end segment qualification, audience size estimation (e.g., using combined recency and frequency), and/or complex segment logic, in accordance with one or more embodiments. In the illustrated embodiment, segment analysis system 100 may include three primary entities/users of the system: advertisers/agencies 102, publishers/customers 112, and end consumers 118. End consumers 118 may also referred to as visitors, such as visitors of a website or other network content.

Advertisers/agencies 102 may be the buyers of ad impression opportunities for online advertising. They may also be the originators of media buys, campaigns, and creatives. In the example shown, advertisers/agencies 102 may be communicatively coupled (e.g., over a network) to demand side platform (DSP) 104 and data management platform (DMP) 108. Coupling to DMP 108 may be via advertising website 106. In one embodiment, advertisers/agencies 102 may provide product content to advertising website 106, where the product content may be presented for display and/or to generate a display. Advertiser website 106 may be network content owned by or otherwise associated with advertisers/agencies. Advertiser website 106 may collect data regarding visitors to the website and provide such data to DMP 108.

DMP 108 may include segment analysis module 120. Segment analysis module 120 may collect, aggregate, store, combines, and/or provide insights on audience behavioral and demographic data for advertiser(s), publisher(s), and agency customers. For example, segment analysis module 120 may determine real-time and back end segment qualification, perform audience size estimation (e.g., using combined recency and frequency), and implement complex segment logic. DMP 108 may allow customers to easily ingest data from multiple online and/or offline data sources.

As shown, DMP 108 may receive offline audience data (also referred to as network content data) from advertisers/agencies 102 and/or publishers 112. Additionally, audience data may be collected at advertising website 106 and delivered to DMP 108. In some embodiments, DMP 108 may additionally or alternatively collect audience data from publisher website 114. Not shown in FIG. 1, but as described herein, DMP 108 may also receive data from a third party data provider. DMP 108 may provide audience segment information (e.g., information indicative of segment qualification) to one or more of DSP 104, supply side platform (SSP) 110, and onsite ad server 116.

DSP 104 may be an advertising campaign management application which allows advertisers to manage their campaign/creative bidding rules, use audience data at scale and/or bid on available display advertising inventory. In one embodiment, advertisers/agencies 102 may provide ad campaigns, creative, and bid rules to DSP 104. In some embodiments, DSP 104 may be integrated with SSP 110 and perform ad exchanges via real-time bidding (RTB) server-to-server pipes. As shown, DSP 104 and SSP 110 are separately illustrated. In various embodiments, DSP 104 may receive RTB advertisements from SSP 110.

In one embodiment, SSP 110 is a platform that aggregates publisher advertisement inventory supply and allows publishers to leverage audience data for revenue optimization. As noted above, SSP 110 may be integrated with DSP 104 via RTB interfaces. In some embodiments, SSP 110 may receive a get ad request from publisher website 114 and provide an advertisement, or facilitate providing of an advertisement, to publisher website 114 to present to end consumer/visitor 118.

Onsite ad server 116 may manage guaranteed advertising buys and advertisement insertions onto publisher pages. Examples include: DoubleClick for Publishers (DFP) and Open Ad Stream (OAS). Onsite ad server 116 may receive a get ad request from publisher website 114 and provide an advertisement, or facilitate providing of an advertisement, to publisher website 114 to present to end consumer/visitor 118.

Publisher(s) 112 may include supplier(s) of advertisement inventory (e.g., available ad slots on pages). As described herein, publisher(s) 112 may send audience data in real-time to DMP 108 as end consumers/visitors browse publisher website 114. As noted above, publisher(s) 112 may also provide offline audience data to DMP 108. Such offline audience data may be provided in bulk feed form, in one embodiment.

Publisher website 114 may be network content, such as an automobile shopping website, a webmail website, etc. Publisher website 114 may be executable by a client device of end consumer/visitor 118. For example, in some embodiments, the client device may include an application (e.g., internet web-browser application) that can be used to generate a request for content, to render content, and/or to communicate requests to various devices on the network. For example, upon selection of a website link on a webpage displayed to consumer/visitor 118 or upon receiving a URL by the browser application, the browser application may submit a request for the corresponding webpage/content to a content server (not shown), and content server may provide corresponding content, including an HTML file, that is executed by the browser application to render the requested website for display to the user. In some instances, execution of the HTML file may cause the corresponding webpage/content, such as publisher website 114 to provide real-time audience data regarding the web browsing of the visitor to segment analysis module 120. Note that while a webpage is discussed as an example of the network content available for use with the embodiments described herein, one of skill in the art will readily realize that other forms of content, such as audio, image, or video files, may be used without departing from the scope and content herein disclosed. Likewise, while references herein to HTML and the HTTP protocol are discussed as an example of the languages and protocols available for use with the embodiments described herein, one of skill in the art will readily realize that other forms of languages and protocols, such as XML or FTP may be used without departing from the scope and content herein disclosed.

Each of DSP 104, advertiser website 106, DMP 108, SSP 110, onsite ad server 116, and publisher website 114 may be communicatively coupled to one another via a network (not shown). The network may include any channel for providing communication between each of the entities of system 100. In some embodiments, the network includes an electronic communication network, such as the internet, a local area network (LAN), a cellular communications network, or the like. The network may include a single network or combination of networks that facilitate communication between each of the entities (e.g., advertiser website 106, DMP 108, SSP 110, onsite ad server 116, and publisher website 114) of system 100. In some embodiments, various components of system 100 may be collocated (e.g., DSP 104 and SSP 110) as part of the same computing device or devices. In one embodiment, one or more of the components of system 100 may be geographically diverse (e.g., located on different computing devices connected over the network). In some embodiments, various components of system 100 may be cloud based.

Note that in various embodiments, some components of system 100 (e.g., DMP 108, DSP 104, SSP 110) may be implemented on multiple computing devices. For example, in one embodiment, DMP 108 may be implemented as a distributed system on a number of cloud nodes and on a number of servers.

While segment analysis module 120 is shown in FIG. 1 as a component of DMP 108, one of skill in the art will readily realize, in light of having read the present disclosure, that segment analysis module 120 may be embodied in a separate system with access to data received by DMP 108, such as offline and/or real-time data, via the network.

Audience data, whether real-time or offline audience data (e.g., first party or from a third party data provider), may include a variety of information, such as cookies, hits, page views, visits, sessions, downloads, first visits, first sessions, visitors, unique visitors, unique users, repeat visitors, new visitors, impressions, singletons, bounce rates, exit percentages, visibility time, session duration, page view duration, time on page, active time, engagement time, page depth, page views per session, frequency, session per unique, click path, click, site overlay, behavioral traits, user intents, user interests, demographic data, etc. The various data may describe usage and visitation patterns for websites (e.g., publisher website 114, advertiser website 106, etc.) and/or individual webpages within the website. The various data may include information relating to the activity and interactions of one or more users/visitors with a given website or webpage. For example, audience data may include historic and/or current website browsing information for one or more website visitors, including, but not limited to identification of links selected, identification of web pages viewed, related content topics, and other data that may help gauge user interactions with webpages/websites.

In some embodiments, audience data may include information indicative of a location. For example, audience data may include location data indicative of a geographic location of the client device of consumer/visitor 118. In some embodiments, location data may be correlated with corresponding user activity. In some embodiments, location data includes geographic location information. For example, location data may include an indication of the geographic coordinates (e.g., latitude and longitude coordinates), IP address or the like or a user or a device. In some embodiments, audience data may include demographic information indicative of the user.

In some embodiments, audience data is accumulated over time to generate a set of audience data (e.g., offline audience data) that is representative of activity and interactions of one or more users with a given website or webpage. In one embodiment, such an accumulation may be performed by various publishers/customers with respect to audience data generated through websites/network content that the publishers/customers own. In one embodiment, such an accumulation may be performed by third party data providers.

The data (e.g., real-time and/or offline) may be used to qualify visitors in a segment, according to the disclosed techniques, and/or to perform real-time audience size estimation for a segment. Such a qualification of a visitor may be usable to select an advertisement to display to consumer/visitor 118. Audience size estimation may be usable to evaluate a worth of a segment. For example, if the segment is sufficiently large, then it may be worth commencing a new advertising campaign or continuing an existing one. Conversely, if the segment is small, then it may not be worth commencing a new advertising campaign directed toward that segment or it may be determined that a new outreach campaign should be commenced to increase the size of the segment.

In some embodiments, segment analysis module 120 may include computer executable code (e.g., executable software modules) stored on a computer readable storage medium that is executable by a computer to provide associated processing. For example, segment analysis module 120 may process real-time and/or offline audience data to perform the techniques described herein.

In some embodiments, a customer/publisher/content provider 112 may log-in to a website or some other user interface/network portal, for example, hosted by DMP 108, and may interact with audience data to create, modify, and/or apply a segment rule. The segment rule may then be usable to determine an audience size and/or qualify visitors in real-time or as an offline back end qualification. Such determinations may be usable to select and place an online advertisement for one or more visitors.

Figure 2:
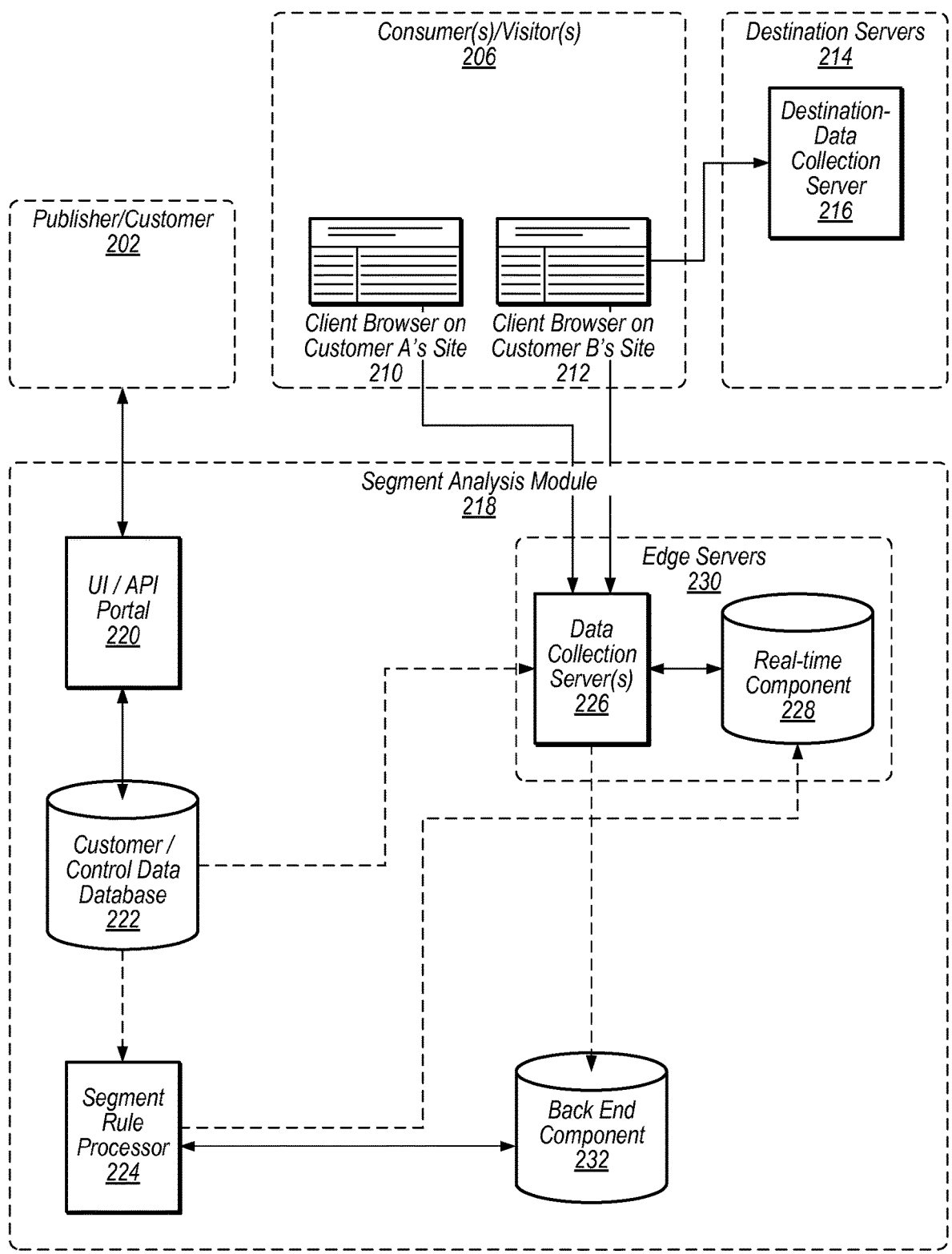
FIG. 2 illustrates a module that may implement support real-time and back end segment qualification, according to some embodiments.
Figure 3:
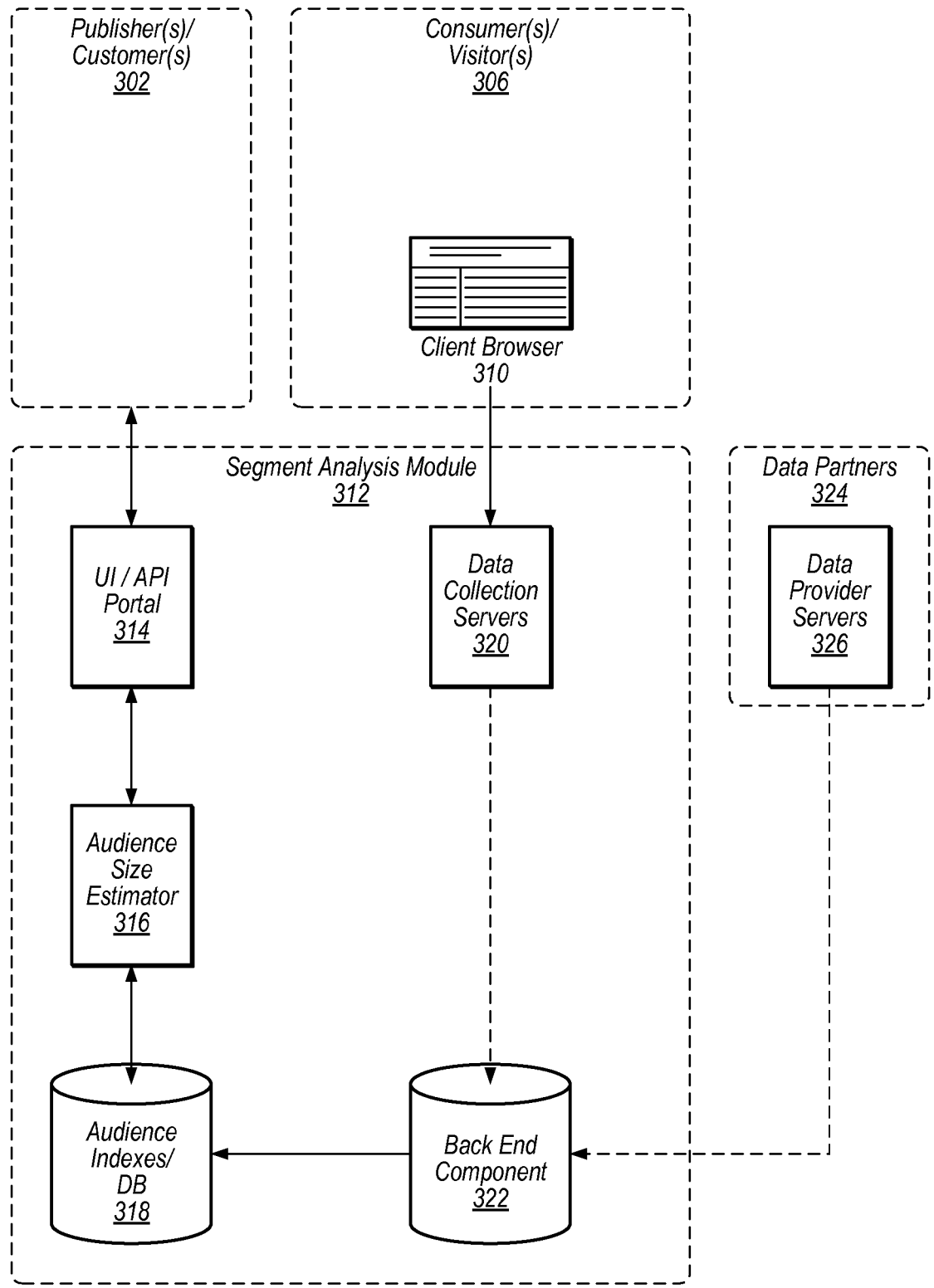
FIG. 3 illustrates a module that may implement real-time audience size estimation and/or complex segment logic, according to some embodiments.

FIG. 2 depicts a module that may implement real-time segment processing and back end segment processing, according to some embodiments. Segment analysis module 218 (which may be the same module as segment analysis module 120 of FIG. 1) may, for example, implement one or more of the techniques described herein at FIGS. 4-5. For simplicity of explanation, the segment analysis module of FIG. 2 is described as implementing the techniques of FIG. 4 and the segment analysis module of FIG. 3 is described as implementing the techniques of FIG. 5. Note that the segment analysis modules of FIGS. 1-3 may refer to the same segment analysis module and may implement any or all of the disclosed techniques.

Segment analysis module 218 may receive, via UI/API portal 220 from publisher/customer 202, input that defines a segment rule. Such input may be provided via touchscreen, mouse, keyboard, or other suitable device. As described herein, the input may include one or more traits, Boolean operator(s), recency/frequency requirements, and/or destination rules, among other inputs. A trait may correspond to a single data collection event from received audience data that is descriptive of a visitor of network content. Example traits may include male, expensive camera, high end car, laptop, etc. For example, the expensive camera trait may correspond to data collection events indicative of browsing for a camera over $500. Based on the received input, a segment rule may be created. The inputs and/or segment rule may persist in customer/control data database 222. Customer/control data database 222 may provide customer segment and destination rules as an asynchronous feed to data collection server(s) 226 of edge servers 230 and segment rule processor 224. Segment rule processor 224 may interface with both real-time component 228 and back end component 232 such that the same segment rule may be used by either or both components, as described herein. In the illustrated embodiment, segment rule processor 224 may provide URL destinations, based on segments determined by back end component 232, to real-time component 228. Data collection server(s) 226 may receive and send destinations from and to real-time component 228. Data collection server(s) 226 may also send an asynchronous data aggregation feed of traits and real-time determined segments to back end component 232 for storage in a data store of back end component 232. Data collection server(s) 226 may also receive first party data via HTTP data collection requests from client browsers 210 and 212, which may be executed on client devices of consumers/visitors 206. Not shown, segment analysis module 218 may also receive third party data (e.g., from data partners 324 of FIG. 3). Third party data is illustrated in FIG. 3 but applies equally to the illustration of FIG. 2. Note that other components not shown in both of FIGS. 2 and 3 may exist in both figures for simplicity of drawing and explanation, are omitted.

Figure 4:
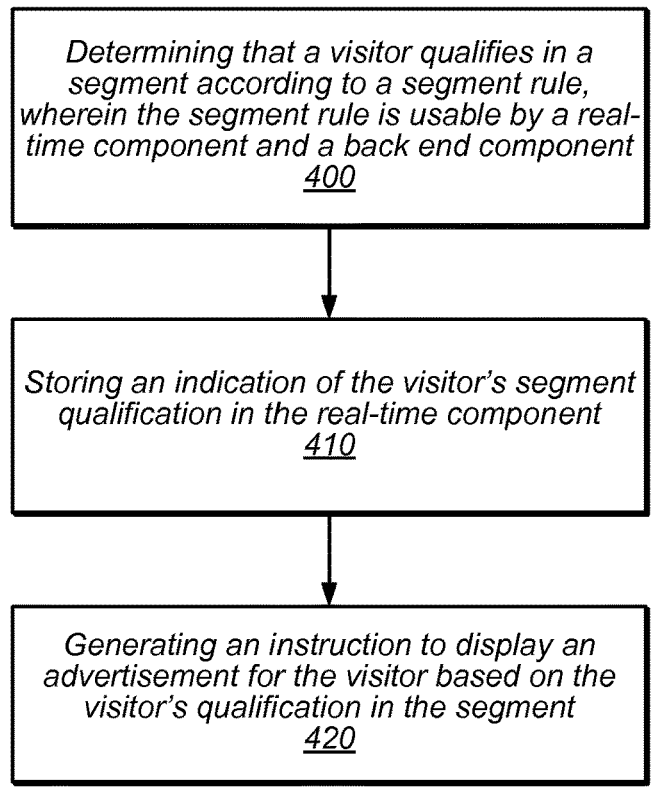
FIG. 4 is a flowchart that illustrates a method for real-time and back end segment qualification, according to some embodiments.
Figure 5:
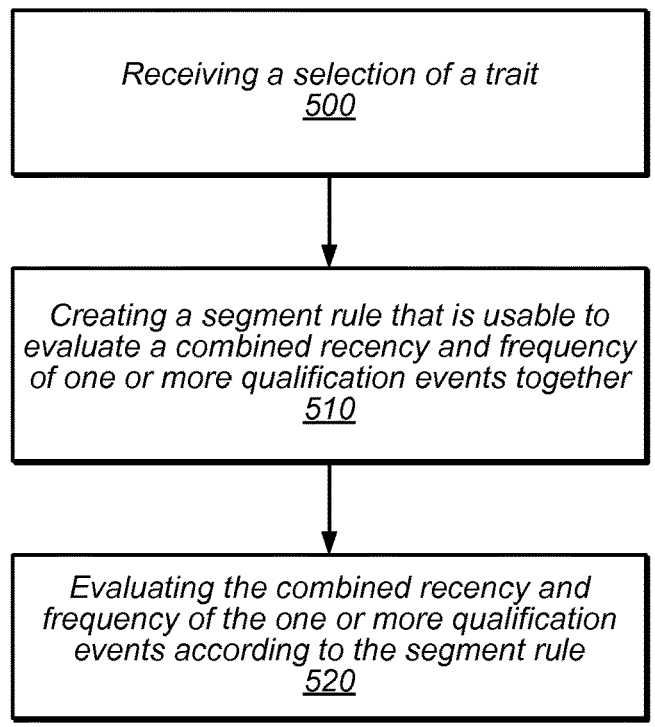
FIG. 5 is a flowchart that illustrates a method for real-time audience size estimation and/or implementing complex segment logic, according to some embodiments.

Segment analysis module 218 may then perform the techniques described herein at FIGS. 4-5 on the received data (e.g., first party from the customer's website and/or third party data) based on the segment rule. For example, either or both of real-time component 228 and back end component 232 may determine that a visitor qualifies in a segment according to the same segment rule, as described herein. Segment analysis module 218 may generate, as output, a destination call to network content (e.g., customer B's website in the illustrated example) such that an HTTP destination URL call may be requested from destination-data collection server 216 of destination servers 214. Segment analysis module 218 may also generate, as output, a report regarding segment audience size, qualifications, or other reports, which may be displayable via UI/API portal 220 and/or stored to a storage medium (not shown), such as system memory, a disk drive, DVD, CD, etc.

FIG. 3 depicts a module that may implement audience size estimation (e.g., real-time) using combined recency and frequency, according to some embodiments. Segment analysis module 312 may, for example, implement one or more of the techniques described herein at FIGS. 4-5. As noted above, for simplicity of explanation, the segment analysis module of FIG. 3 is described as implementing the techniques of FIG. 5. Note that the segment analysis modules of FIGS. 1-3 may refer to the same segment analysis module and may implement any or all of the disclosed techniques.

Segment analysis module 312 may receive input, via UI/API portal 314, from publisher/customer 302. Such input may be provided via touchscreen, mouse, keyboard, or other suitable device. As described herein, the input may include one or more traits, Boolean operator(s), recency/frequency requirements, and/or destination rules, time ranges, among other inputs. Based on such input, a segment rule may be created and/or an audience may be defined. In an audience size determination application, a synchronous query for audience size may be sent from UI/API portal 314 to audience size estimator 316 and a real-time determination of the audience size may be provided from audience size estimator 316 to UI/API Portal 314. A similar synchronous query and result may also take place between audience size estimator 316 and audience indexes/database 218.

Back end component 322 may receive, via an asynchronous data aggregation feed from data collection servers 320, first party data via HTTP data collection requests from client browser 310, which may be executed on a client device of consumers/visitors 306. Back end component 322 may also receive third party data from data provider servers 326 of data partners 324. Third party data may be received as a bulk asynchronous feed. Back end component 322 may then provide visitor/trait data from the first and third party data in an asynchronous feed to audience indexes/database 318, upon which the data may be used to determine audience size, as described herein.

Segment analysis module 312 may then perform the techniques described herein at FIGS. 4-5 on the received data (e.g., first party from the customer's website and/or third party data) based on the segment rule. For example, real-time audience size estimation may be performed according to the segment rule, which may include combined recency and frequency, as described herein. Segment analysis module 312 may generate, as output, a destination call to network content such that an HTTP destination URL call may be requested. Segment analysis module 312 may also generate, as output, a report regarding segment audience size, qualifications, or other reports, which may be displayable via UI/API portal 314 and/or stored to a storage medium (not shown), such as system memory, a disk drive, DVD, CD, etc. Examples of such reports are shown in FIGS. 14-18.

Turning now to FIG. 4, one embodiment of real-time and back end segment qualification is illustrated. While the blocks are shown in a particular order for ease of understanding, other orders may be used. In some embodiments, the method of FIG. 4 may include additional (or fewer) blocks than shown. Blocks 400-420 may be performed automatically or may receive user input. In one embodiment, the segment analysis module of FIGS. 1-3 may implement the method of FIG. 4.

As shown at 400, it may be determined that a visitor qualifies in a segment according to a segment rule. Determining that the visitor qualifies in the segment may include evaluating network content data. Network content data may include audience data, as described herein, such as real-time audience data and/or offline audience data. In some embodiments, at least some of the network content data may be received from a third party data provider. For example, various network content sites may provide data about various visitors to a third party data provider who may aggregate that data and provide it to the segment analysis module.

In one embodiment, at least some of the network content data that is received from the third party data provider may be matched with at least some other of the network content data that is associated with the visitor's visit to the first network content. The result of the matching may be matched data. Determining that the visitor qualifies in the segment may be based on the matched data. As an example of matched data, a visitor may have logged into network content under a profile associated with the visitor (e.g., logged into a social networking website, shopping website, forum, etc.) or may have entered data into an online form. Data created during the visit and logging in under a profile or entering information into an online forum may include demographic information (e.g., name, age, gender, occupation, etc. Data created during that visit may also include a visitor identifier (e.g., IP address, MAC address, etc.) associated with the visitor. The data from the third party provider may also include the same visitor identifier thereby allowing data having the same visitor identifier to be matched. As an example, it may be known that visitor A is male because he logged in under his profile to a social networking site. Third party provider may have data from months ago that includes the visitor's IP address that matches the visitor's IP address from where the visitor logged in to the social networking website. Therefore, the data from the third party provider may then be determined as corresponding to a male visitor.

In various embodiments, the same segment rule may be used in both the real-time component and the back end component. For example, the segment rule may be usable by the real-time component, during the visitor's visit to first network content (e.g., the website of a first customer), to determine that the visitor qualifies in the segment. The segment rule may also be usable by the back end component to determine that the visitor qualifies in the segment. In some embodiments, determining that the visitor qualifies in the segment may be performed by the real-time component, back end component, or both. In one embodiment, determining that the visitor qualifies in the segment may be performed by the back end component after the visitor has completed visiting the first network content (e.g., visiting second network content or after the visitor's browser is closed).

Evaluating network content data by the backend component may include performing a full table scan on an hbase cluster (or comparable data store) that stores billions of visitor profiles. Each profile includes network content data associated with one of the visitors. Moreover, evaluating network content data (by the real-time and/or back end) may include evaluating the network content data for all of the active segment rules. Note that many segment rules may exist at once but for ease of explanation, however, much of the description focuses on a single segment rule. In various embodiments, evaluating network content data may be performed periodically (e.g., once an hour, once a day, once a week, etc.) by the back end component. Periodic evaluations may result in updated visitor qualifications based on a new, updated, or changed segment rule, or based on new data that allows a visitor to be qualified under the segment rule.

In various embodiments, at least some of the network content data, which is evaluated according to the segment rule, may be associated with the visitor's visit to first network content.

In some embodiments, determining that a visitor qualifies in the segment may be performed after or in response to a change to a previous segment rule. For example, the previous segment rule may have defined a male, high end car segment as a visitor who is male and has visited a high end car (e.g., MSRP>$50k) website (or distinct webpages) five times in the previous three days. The updated segment rule may lower the threshold of high end car to MSRP>40k. Accordingly, qualification of the visitor in the segment may be determined automatically in response to the update to the segment rule or it may require user input to determine qualification under the updated segment rule.

In some embodiments, the segment rule may be created after the visitor has completed visiting the first network content. For example, similar to the example above, a segment rule for a male, high end car segment may be created after the visitor has already visited a high end car website the requisite number of times to qualify in the segment. Moreover, the segment rule may be created after the visitor has left the first network content such that the visitor is not actively browsing the first network content. Accordingly, the visitor may be qualified, for example, by the back end component, after such a visit to the network content is complete by using the newly created segment rule and offline data (e.g., first party from the customer who owns the first network content or from a third party data provider, etc.).

In some embodiments, a visitor may qualify in a segment based entirely on third party provided data. Such embodiments may permit a customer to target an advertisement to a visitor who has never visited a website associated with the customer. In other embodiments, first party data (e.g., from the visitor's visit to a website), third party data, or some combination of first and third party data may be used to qualify the visitor in a segment.

In one embodiment, the same segment rule and same code libraries may be shared across both the real-time component as well as the back end component application. The code libraries may exist on each of the data collection servers of the real-time components and also on a plurality of nodes of the back end components. In one embodiment, the back end component application may be a Map-Reduce application implemented in Java. The same core logic may be used in both the real-time and back end components. The data storage layer for the real-time component, though, may be different than the data storage layer for the back end component. In the case of the real-time component, the data storage layer may be a combination of visitor cookie data as well as behavioral trait data stored in the real-time profile cache server (PCS) machines. In one embodiment, the data storage layer for the back end component may be a distributed data store implemented in the cloud, such as an hbase cluster.

At 410, an indication of the visitor's segment qualification may be stored in the real-time component. In an embodiment where determining that the visitor qualifies in the segment is performed by the back end component, storing the indication may include the back end component providing the indication to the real-time component. Note that an indication of each segment that the visitor qualifies for may be stored in the real-time component. For example, a visitor may qualify for multiple segments, each of which may be represented in the real-time component by an indication of the qualification.

As illustrated at 420, an instruction to display an advertisement for the visitor may be generated based on the visitor's qualification in the segment. The instruction may be a destination call that is a URL into another system that sends a unique segment identifier and allows the other system to associate it to the visitor based on cookies in their own domain. The URL destination delivery may happen within a safe/protected IFRAME to ensure it does not impact perceived page performed on the customer website and to ensure a high degree of security to the customer's own domain and the document object model (DOM) of its pages. The destination may be delivered via server-to-server destinations (e.g., DSPs 104) or by having the real-time destination sent to the real-time component, to be delivered the next time the visitor visits a website of the customer owning the segment (or any other customer's website). For example, in one embodiment, based on the stored indication of the visitor's segment qualification, the real-time component may deliver a destination call associated with the segment to second network content during the visitor's visit to the second network content. The destination call may be usable to request and display the advertisement associated with the segment.

In one embodiment, the second network content may be different network content than the first network content. For example, the first network content may be one webpage of a website of a customer (e.g., the home webpage of an automobile shopping website) and the second network content may be a different webpage of the same website (e.g., an about us webpage of the automobile shopping website). In such an instance, the advertisement may be delivered while the visitor is on the same website, but a different page of the same website.

In one embodiment, the second network content is network content associated with a different customer than the first network content. For example, the first network content may be a website of one customer (e.g., an automobile shopping website owned by company/customer A) and the second network content may be a website of a different customer (e.g., a webmail website owned by company/customer B). In such an instance, an advertisement associated with customer A, which may be based on the user's qualification in a segment created by customer A, may be delivered after the visitor has left the website owned by company/customer A (e.g., while the visitor is visiting the website owned by company/customer B). In fact, the advertisement associated with customer A may be delivered to the visitor even if the visitor never again returns to the website owned by customer A.

In some embodiments, after display of the advertisement (e.g., in a browser or some other interface of the visitor), the real-time component may provide an indication of the display of the advertisement to the back end component. The back end component may then store the indication of the display of the advertisement. The stored indication of the display of the advertisement may be used in selecting which advertisement to present to a visitor. For example, each advertisement may be presented to each visitor only a limited number of times (e.g., once, five times, etc.). By maintaining an indication of which advertisements have been displayed to a particular visitor, a variety of advertisements pertaining to the segment(s) for which the visitor qualifies may be presented.

In one embodiment, the real-time component may apply the segment rule to the visitor and determine that the visitor does not qualify in the segment with such a determination being based on less data than the network content data. The back end component, based on the network content data, may determine, however, that the visitor qualifies in the segment. Such a determination by the back end component may qualify the visitor in the segment regardless of the determination by the real-time component that the visitor does not qualify. As a simple example, real-time component may not have the storage capability to store much old data (e.g., older than one month) whereas the back end component may have that storage capability (e.g., over a year's worth of data). Therefore, the back end component may qualify the visitor based on older data that is available to the back end component but not to the real-time component. Therefore, the determination, by the back end component, that the visitor qualifies may be based on the network content data whereas the determination, by the real-time component, that the visitor does not qualify may be based on less data than the network content. Consider an example regarding a seasonal event, such as tax season. A visitor may not visit any tax preparation related websites outside of February each year. Therefore, in September, the real-time component may not have access to any data that may qualify a visitor as interested in tax preparation whereas the back end component may have access to data from February that could qualify the visitor.

Turning now to FIG. 5, one embodiment of audience size estimation and/or implementing complex segment logic (e.g., combined recency and frequency, n-level deep nested Boolean expressions, etc.) is illustrated. While the blocks are shown in a particular order for ease of understanding, other orders may be used. In some embodiments, the method of FIG. 5 may include additional (or fewer) blocks than shown. Blocks 500-520 may be performed automatically or may receive user input. The method of FIG. 5 may be used in conjunction with the method of FIG. 4. Accordingly, a combination of some or all of the blocks of FIGS. 4-5 may be used in some embodiments. In one embodiment, the segment analysis module of FIGS. 1-3 may implement the method of FIG. 5.

As shown at 500, a selection of a trait may be received. As described herein, the trait may be descriptive of visitors of network content. Example traits may include male, car buyer, between ages 40 and 50, interested in laptops, etc. Selection of a trait may be received via a user interface or portal, for example, from a customer associated with network content. Example user interfaces are shown in FIGS. 7-18, and are described in more detail below. In some embodiments, selection of other traits that are also descriptive of visitors of network content may be received. For example, selection of any number (e.g., three, five, seven, etc.) of traits may be received.

At 510, a segment rule may be created that is usable to evaluate a combined recency and frequency of one or more qualification events together. The qualification events may indicate qualification of a visitor according to a trait. The one or more qualification events may be based on collected network content data (e.g., audience data) associated with a plurality of visitors. Each of the one or more qualification events may correspond to qualification of a separate portion of the collected network content data according to the trait.

In contrast to a system that separately evaluates recency and separately evaluates frequency, evaluating a combined recency and frequency of one or more qualification events together may include evaluating a number of qualification events over a defined period of time (e.g., the visitor qualified x times over the past y days). A system that separately evaluates recency and frequency may evaluate a most recent event and separately evaluate a frequency counter of the event (e.g., the visitor qualified x times total and qualified once in the past y days). A simple example illustrates the difference. Consider a scenario in which visitor A has visited a high end car website once a month for the past five months with the most recent occurrence being two days ago. At block 510, a segment rule may be created that defines a high end car buyer segment as someone who has visited a high end car website five times in the past three days. Visitor A, who has visited such a website once a month for the past five months with the most recent visit being two days ago would not qualify according to the five times in the past three days combined recency and frequency segment rule. However, in a system that considers the recency and frequency separately, visitor A would qualify under frequency as having visited a high end car website five times total and would also qualify under recency because they visited a high end car website two days ago. Marketers are often interested in the intensity with which visitors are associated with a trait. Evaluating the combined recency and frequency may reflect the intensity whereas separate recency and separate frequency does not. In the example above, visitor A is not associated with very much intensity and therefore may be viewed, by marketers, as a casual browser of the high end car website rather than a serious consumer of high end cars.

In one embodiment, each of the one or more qualification events may be associated with a time of occurrence of the respective qualification event. Each time of occurrence may be stored with an indication of the respective qualification event, as opposed to a system that only stores the most recent timestamp of a qualification event. Such times of occurrence may be usable in evaluating the combined recency and frequency according to the segment rule.

In some embodiments, an indication of each of the one or more qualification events may be stored (e.g., in a data store). In some embodiments, the data store may be local to the real-time component, such as in a data store that is quickly accessible (e.g., a data cache). In some embodiments, the indication may be stored in the back end component in addition to or instead of storing the indication local to the real-time component.

In an embodiment in which multiple traits are selected, a selection of an operator for the segment rule may be received. The operator may be for a Boolean expression that includes the trait and another trait. For example, the segment rule may include one or more instances of the operators AND, OR, NOT AND, or NOT OR. As a simple example, a segment rule may be male AND high end car buyer. Note that the above discussed combined recency and frequency may be applied across one or more of the multiple traits. Moreover, a segment rule having a Boolean expression may have such a Boolean expression in addition to or instead of combined recency and frequency. Therefore, in some embodiment, a segment rule may not use the described combined recency and frequency but instead, my use one or more of the described Boolean expression. As another simple example, consider a segment rule that is defined as high end car buyer AND high end boat buyer. The combined recency and frequency can be applied to either high end car buyer, high end boat buyer, or both traits. In some embodiments, the segment rule may be an n-level deep nested Boolean expression. Such an example is illustrated in FIG. 17, at item 1702.

In one embodiment, the complex segment logic may be implemented as a domain specific language (DSL). One example implementation is in Java, using Another Tool for Language Recognition (ANLTR). The DSL rules may support: Boolean expressions that are next N-levels deep (e.g., no limitation on nesting depth); operators that include AND, OR, NOT; a combined recency and frequency (R/F) operator, which can be applied to one or a list of traits; R/F operators ==, >=, <=; and optional inclusion of recency in the R/F expression.

As illustrated at 520, the combined recency and frequency of the one or more qualification events may be evaluated according to the segment rule. Evaluating the qualification events according to the segment rule may include reading the qualification events from the data store, which may include reading a respective time of occurrence of the respective qualification events.

In one embodiment, evaluating the qualification events according to the segment rule may include estimating the segment population size based on the stored indications of each of the one or more qualification events. The segment population size may indicate the number of unique visitors that qualify under a segment according to the segment rule. The segment population size may be performed for one or more time ranges. For example, the segment population size may be for the last 7 days, last 30 days, last 60 days, etc. Estimating the segment population size for a time range may include evaluating the combined recency and frequency of each qualification event (e.g., including a time of occurrence associated with each respective qualification event) that is within the time range.

In one embodiment, estimating the segment population size may include executing a search query on a data store of the back end component that searches millions of visitor profiles (from first and third party data) nearly immediately. The search service may be referred to as a distributed search cluster service with the result being a real-time estimation of the segment population size. In one embodiment, the search service may be implemented as a SOLR cluster (or comparable open source search tool) of the segment analysis module. For example, all the visitor profiles and traits may be stored in a SOLR cluster. Upon receiving an audience definition/segment rule (e.g., via a UI/portal), a query to search the SOLR cluster may be executed. The SOLR cluster may then return the number of visitors qualifying under the audience definition. Other embodiments may use a traditional database.

The segment population size for the time period (e.g., for one time period) and other respective segment population sizes (e.g., for other time periods) may be provided for display. The segment population size and each of the other respective segment population sizes may each correspond to a respective time range of a plurality of time ranges. Example displays of such segment population sizes are shown in FIGS. 14-18. The UI/portal may provide a calculate/recalculate segment population input option. Upon selecting such an option, a query may be generated to the backend, as described herein, which may then return the segment size estimation. Note that if the segment rule is defined as three occurrences (e.g., qualification events) in the last seven days, then the segment size estimation over the last 30 days corresponds to qualification of visitors over any 7 consecutive day period in the last 30 days. For example, the last 30 days segment population may include a visitor who qualified based on data from days 1-7 and another visitor who qualified based on data from days 21-27.

In one embodiment, a future segment population size may be estimated based on the estimated segment population size. For example, the system may determine the estimated segment population size has a trend of a 10% increase for each 60 day period. Therefore, the system may estimate that the future segment population size may continue to increase by 10% for subsequent 60 day periods.

In various embodiments, an advertisement to be provided to the visitor of network content may be determined. Note that which specific advertisement is chosen may be selected by an ad server (e.g., onsite ad server 116). In other instances, the segment analysis module may select the advertisement or simply provide an instruction that includes which segments a visitor qualifies for. That instruction may be accompanied with which advertisements a particular visitor has already seen such that any advertisement viewing limits may be respected. The evaluating of block 520 may result in the visitor qualifying for a segment associated with a particular advertisement.

The disclosed techniques may have the speed advantages of real-time segment qualification along with the data storage scale advantages of back end segment qualification. The back end segment qualification additionally permits qualification of visitors even without ever seeing that visitor again. Moreover, by using real-time qualification in conjunction with backend qualification, there may be less discrepancy rates as opposed to simply using real-time qualification and waiting for the visitor to stick around. Further, the disclosed techniques may support arbitrarily complex rule definitions and permit the ability to qualify visitors into segments in real-time. The disclosed techniques may also support arbitrarily deeply nested Boolean expressions. Additionally, the disclosed techniques may provide real-time feedback to a customer on segment population size as the segment rule is being defined, something that otherwise may not be achieved with a traditional relational database system.

Figure 6:
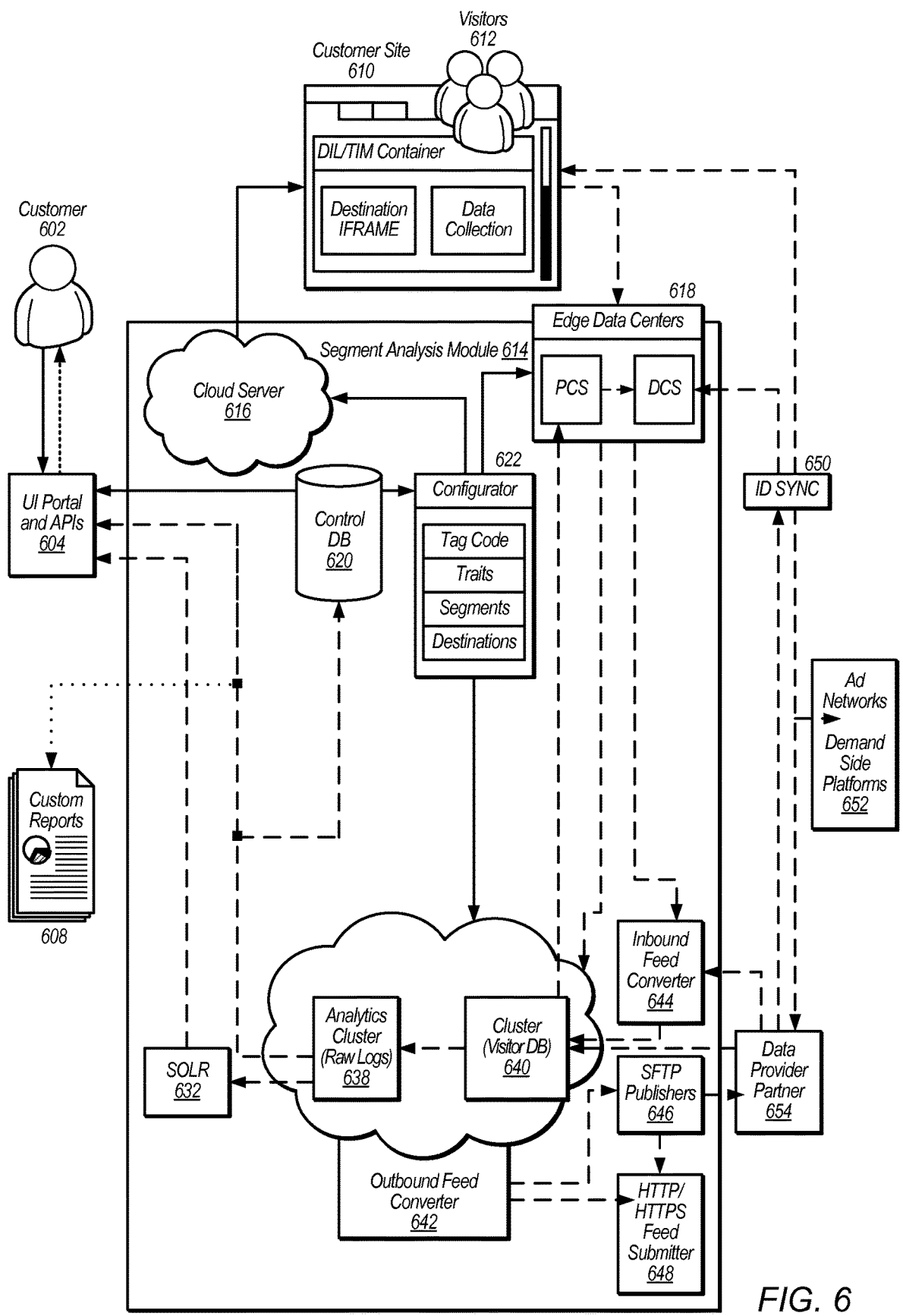
FIG. 6 illustrates an example block diagram of a system configured to implement the methods of FIGS. 4 and 5, according to some embodiments.

FIG. 6 illustrates an example block diagram of a system configured to implement the methods of FIGS. 4-5, according to some embodiments. Note that certain portions of FIG. 6 are similar to portions of FIGS. 2 and 3. For those portions, description similar to that of FIGS. 2 and 3 applies to FIG. 6 but, for brevity, is not necessarily repeated. Solid lines between components of FIG. 6 may represent customer driven data, dashed lines may represented visitor driven data, and the dotted line to custom reports 608 may represent reporting data. Beginning at the top of FIG. 6, visitors 612 may visitor a customer website 610. Customer website 610 may be presented in a browser application of a client device of visitor 612. A JavaScript (e.g., data integration library (DIL)) hosted by the customer may be loaded, which may call an IFRAME that is hosted (e.g., on an Akamai server) that may be used for real-time destinations (e.g., where to send a URL to get an advertisement).

Data about the visitor's visit and/or about the visitor may be collected through customer website 610 and provided to edge data centers 618, which maintain the traits and segments. The DCS may store trait qualification activity to PCS, which may be a low latency edge cache database (e.g., implemented on top of a NoSQL database technology). The DCS may read times of trait qualifications of visitors from the PCS in real-time to determine segment qualification. Note that back end ingested trait data may also be stored at edge data centers 718 to take advantage of real-time speed with greater flexibility in segment qualification. Log files that include information about the visitor and what the visitor did during the visit may then be sent to cluster (visitor database) 640, which is implemented in the cloud in the illustrated embodiment. Sending of the log files may be periodic (e.g., every 10 minutes). Cluster (visitor database) 640 may store a large number of visitor profiles (e.g., more than 6 billion). Once that data is written to cluster (visitor database) 640, which may be part of the back end component, it may be written out to analytics cluster (raw logs) 638. Analytics cluster (raw logs) 638 allows for an association between visitor and trait. Periodically (e.g., once a day, twice a day, etc.), analytics cluster 638 may then write its stored data to SOLR 632 to update the SOLR indexes. That data may include a trait/time combination for each visitor for each qualification event. Estimates of segment size may then be performed according to the techniques disclosed herein. Such estimates may be provided as customer reports 608 and/or as data for display at UI portal and APIs 604 for customer 602.

From the viewpoint of customer 602, UI Portal and APIs 604 may call a customer API that interacts with the SOLR cluster to generate queries on the dataset and return results and a confidence interval based on the data set result size. The result is that customers can receive nearly instant feedback even while creating extremely complex segments. As described herein, customer 602 may define a segment rule by inputting traits, destination rules, R/F operators, among other inputs. That rule is stored and persisted in control database 620. Via configurator 622, tag code, traits, segments, and destinations are shared between the real-time component (including edge data centers 618) and the back end component (including cluster 640 and analytics cluster 638). TIM Tags, Destination Publishing, and Data Collection Scripts may then be pushed through a cloud-based server 616 to the DIL/TIM container of customer site 610. The destination IFRAME may be used for performing ID sync calls via ID sync 650. For example, the destination IFRAME may be used when trying to match a visitor ID with an ID from third party data for server to server file transfers. The IFRAME is a separate frame that can have a different source from the current domain that the visitor's browser is in. The IFRAME may be hidden from the visitor such that the visitor never sees it. Therefore, data transfers and data synchronization may be performed without impacting the end user/visitor. Additionally, the IFRAME is boxed off from a security standpoint. Whatever happens in the IFRAME cannot impact the customer domain. Using the IFRAME and the call to the DCS, a URL destination can be sent to send information to a third party.

Data provider partner 654 represents a third party data provider. Third party data may be matched to other data via ID sync 650. Third party data (and first party data from edge data centers 618) may be processed by inbound feed converter 644 before being stored in the backend (e.g., cluster 640). Outbound feed converter 642 of the back end component may likewise process data from the backend before sending it to SFTP publishers 646 and HTTP/HTTPS feed submitter 648. Such data from the back end may be provided to data provider partner 654.

As shown in the right side of FIG. 6, an instruction may be provided to ad networks/demand side platforms 652 indicative of a visitor's segment qualification and/or indicative of an advertisement to present for display to that visitor.

FIGS. 7-18 illustrate screenshots of an example graphical user interface for which various embodiments may be performed. FIG. 7 illustrates interface 700 for managing various segments according to a list view. Context-specific tool bar 702 of interface 700 may present a variety of context-specific actions. For example, Create a New Segment, Add Selected to Destination, Create Model with Selected, Delete Selected, are among other possible actions may be presented in context-specific tool bar 702. Some actions may appear based on specific interactions. For example, Create Model with Selected may only appear after selection of a segment. Search 704 permits segment-specific searches to be performed. The search/filter element may be specific to searching segments. Entering a character in the search input may immediately filter the segment list to segments that contain the term or sequence of characters. Folder browser 706 allows users to navigate folders and/or sub-folders that contain segments. Folders that contain children can be toggled open by clicking the folder icon. Activating a folder filter may activate a segment list view, an example of which is shown in FIG. 7, to display the segments contained within the selected folder. The list of segments 708 may be sortable, filterable, and/or include tabular data. Segment elements may be sorted, for example, by clicking the table header of the column. Segment hyperlinks 710 may be selectable (e.g., via mouse click, touchscreen, or other selection) to take the user to a segment detail page/summary. Segment description 712 may appear in a bubble, as shown, when hovering (e.g., with an indicator of a mouse) over the segment row. Segment actions 714 may be displayed upon hover over and may include actions such as edit segment, pause/activate segment, clone segment, and/or remove segment, among others. Hovering over an action icon may cause display of a tool tip describing the action. Segment selection 716 may permit users to select segments, for example using checkbox elements, to remove the selected segments from the list view.

Figure 8:
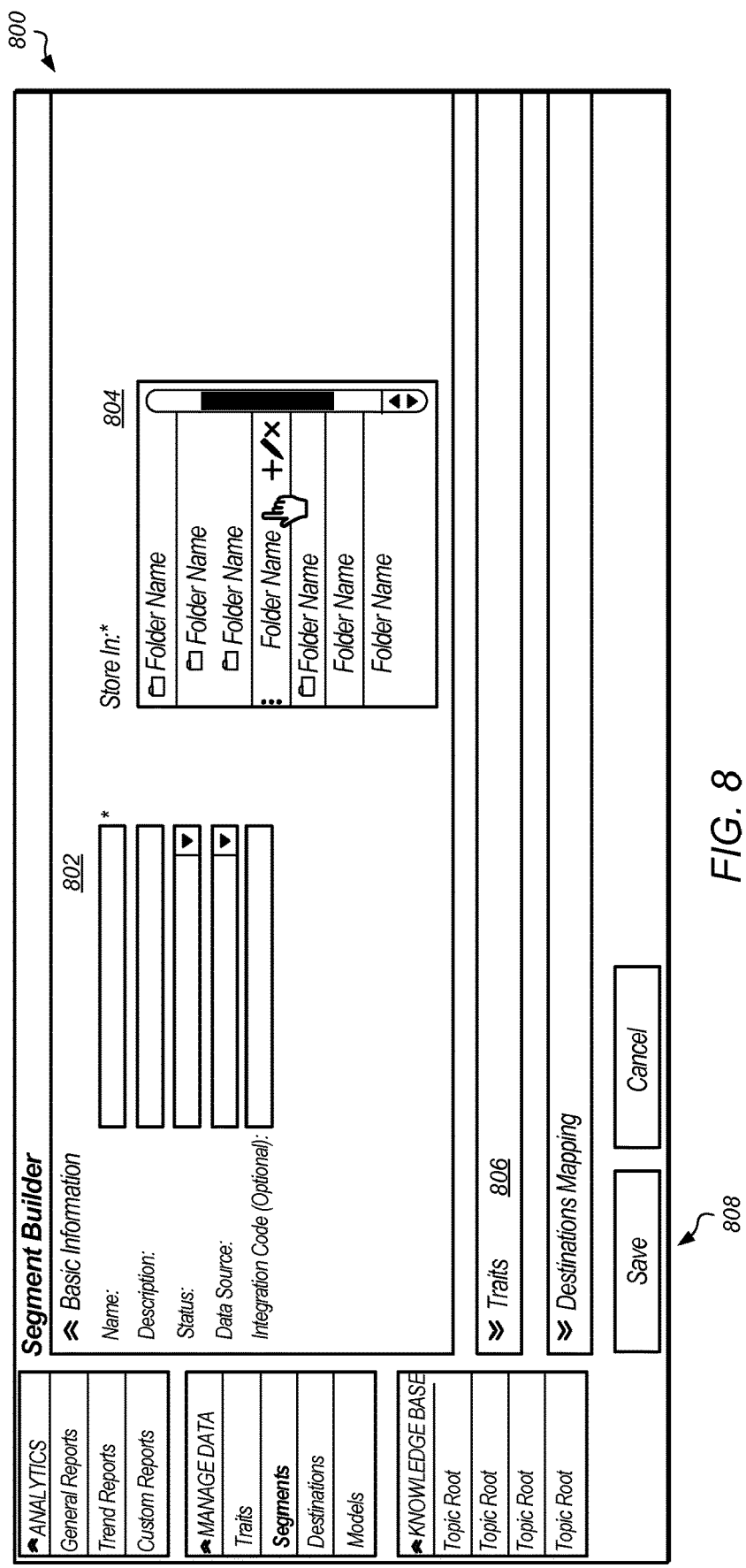

FIG. 8 shows a snapshot of an example display 800 of the basic information options for creation of a new segment. Basic information tab 802 may be open by default. Segment storage 804 may permit users to select a folder to store a new segment. FIG. 8 illustrates collapsed accordions 206 for both the Traits and Destinations Mapping tabs. The collapsed accordions may be expanded and likewise, expanded accordions (e.g., basic information) may be collapsed. Expanding/collapsing may be toggled, in one embodiment, via selection of the double carrot to the left of the tab name. Save/cancel 808 may be selected in FIG. 8 to apply any previous input(s), such as segment name, description, status, data source, integration code, etc. as shown in basic information tab 802.

Figure 9:
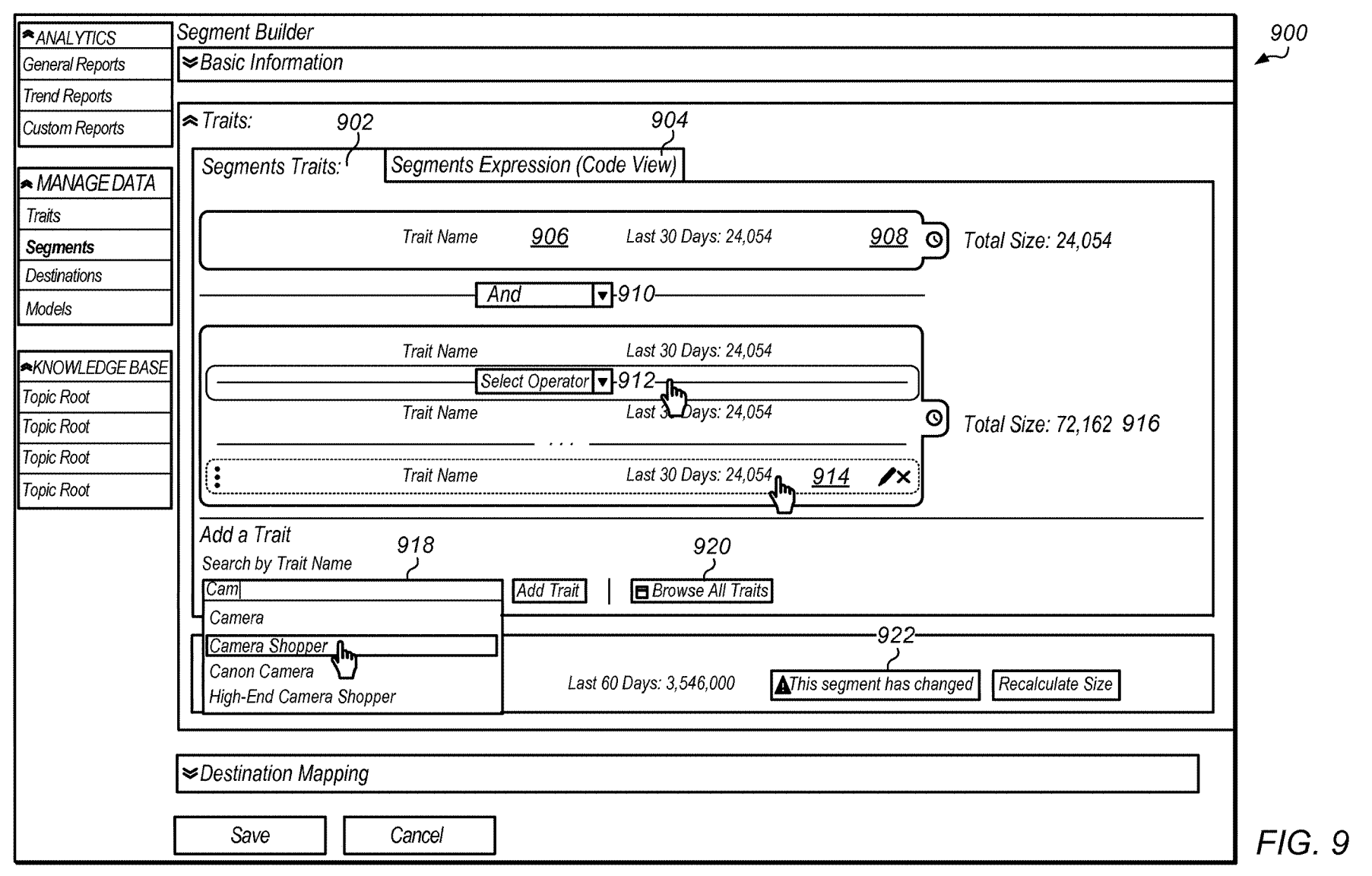

FIG. 9 shows a snapshot of an example display 900 of the expanded trait tab/accordion, which may be used to create a new segment. The default active tab 902 may be a what-you-see-is-what-you-get (WYSIWYG) view. Code view tab 904 may permit a user to see the code that is generated from the WYSIWYG view and or permit a user to define a segment and/or traits using a code view. For example, a user may also simply type or otherwise input a code expression into the segment expression code view. An example of the code view is shown in FIG. 17. Displayed trait 906 may be composed of a hyperlinked trait name and the last 30 day unique visitors (e.g., 24,054 in the example shown). Clicking a trait hyperlink may open a modal window, or other display, that displays read-only basic information regarding the trait. Such a display that displays read-only basic information regarding the trait is shown in FIG. 11. Added traits may be automatically grouped together but can be separated by operators (e.g., Boolean operators). Icon 908 (shown as a clock symbol) may indicate if recency and frequency rules have been added to a trait or a group of traits. Selection of icon 908 may permit the frequency and/or recency rule to be modified. Operators 910 may allow traits or groups to be separate by operators such as AND, OR, AND NOT, and/or OR NOT. Hovering between two traits may display operator selection interface 912. Selecting an operator may separate the traits or groups of traits. Hovering over a trait may expose trait tools 914, such as edit, remove, and/or drag-and-drop tools. As one example, a trait may be dragged vertically into the desired position according to the drag-and-drop tool. As another example, a trait may be edited by clicking the edit icon or a trait may be removed from the list by clicking the remove icon. Total size 916 may be calculated as the sum of the 30-day unique visitors of all of the traits in a group. Add trait 918 permits input to enter a rule into the interface. Typing in the Search by Trait Name field of add trait 918 may display existing traits that can be selected and added to the segment. As shown, the user here is searching for "Cam" with results being "Camera", "Camera Shopper", "Canon Camera" and "High-End Camera Shopper." New traits are added to the bottom of the other traits that are already shown and may be automatically grouped with the last trait in the list. Interface 900 may provide indication 922 that is indicative of a changed segment. Such an indication may prompt a user to select Recalculate Size to recalculate the size of a segment, as described herein. The example display of FIG. 9 may also permit selection of Browse All Traits 920, which may open a modal interface containing a filterable, searchable list of traits, as shown in FIG. 10.

FIG. 10 illustrates an example of the modal interface upon selection of Browse All Traits 920 of FIG. 9. Trait-specific search 1002 is a search/filter element specific to traits. Entering a character in the search input may filter the trait list to traits that contain the term or sequence of characters. Folder browser 1004 permits navigation of folders and sub-folders that contain traits. Folders containing children can be toggled open by clicking the folder icon. Activating a folder may cause the trait list view to display the traits contained within the selected folder. Trait selection 1006 is indicated by the checkbox next to a given trait. Traits may be selected by clicking anywhere on the trait row and is not limited to the actual checkbox. In some embodiments, trait data 1008 may not permit trait name hyperlinks or trait actions in the model interface of FIG. 10. Action buttons 1010 may permit selected traits to be added to a segment by clicking Add Selected Traits to Segment. Clicking Cancel closes the interface, ignoring whatever selections were made, and returns the user to the segment builder display of FIGS. 7-9.

Selecting a hyperlinked trait name in the segment builder (e.g., hyperlinked trait name 710 of FIG. 7) may open another modal interface 1100, as shown in FIG. 11. Modal interface 1100 displays read-only basic information for the selected trait with name 1102. The display of the information is read-only in that no actions may be taken regarding the trait or segment in from the interface of FIG. 11. As shown, various information may be presented in the interface of FIG. 11 including a trait ID (e.g., 85495), name (e.g., Trait Name), description, type, data source, integration code, stored location, data category, unique visitors for various time ranges (e.g., 7 day, 30 day, 60 day, etc.), and/or comments regarding the trait.

Figure 12:
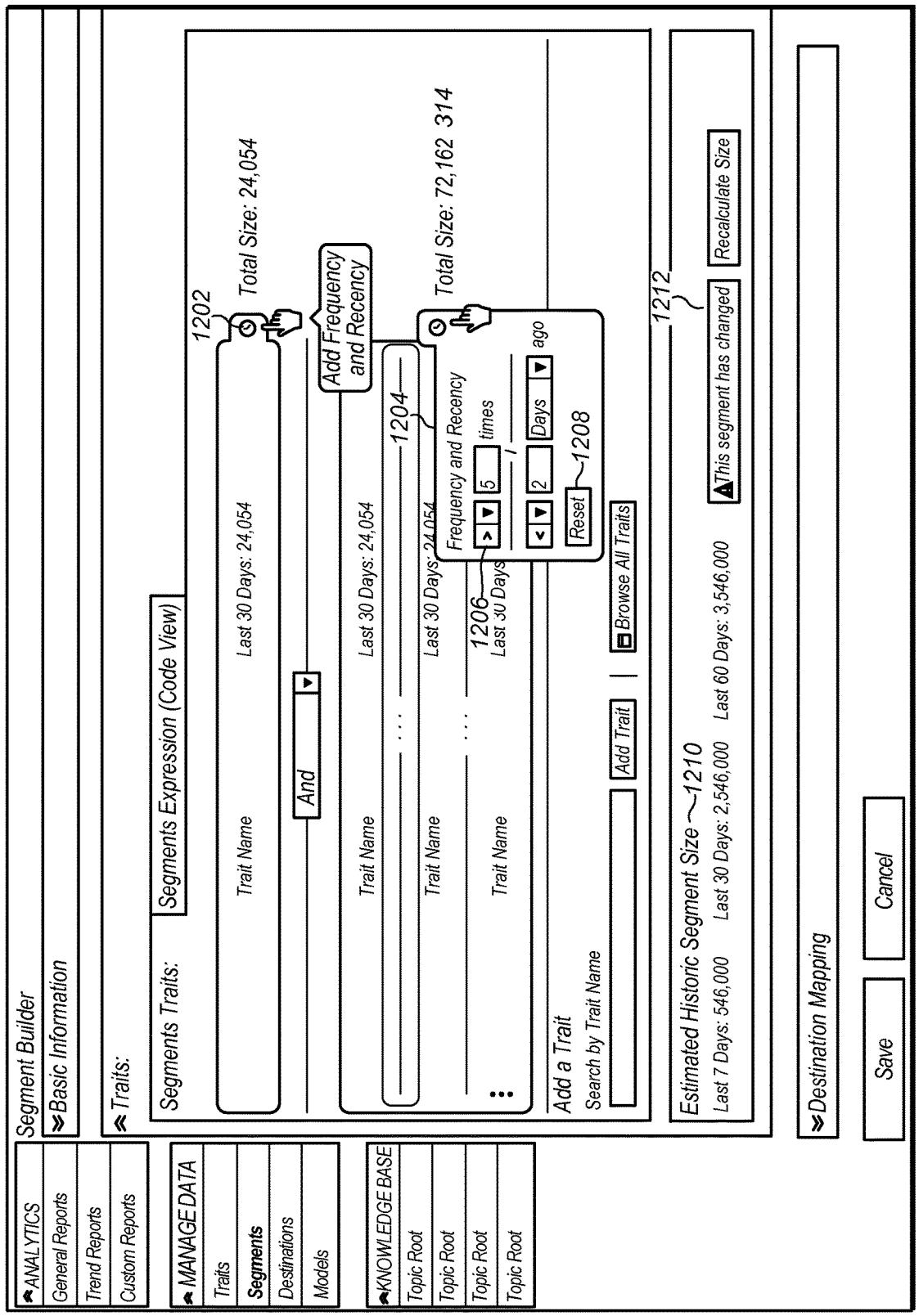

As shown in example interface 1200 of FIG. 12, selecting the recency-frequency icon 1202 for a given trait or group of traits may present a recency frequency interface 1204 over the selected trait or group of traits for which the recency frequency operator is to be applied. Recency frequency selectors 1206 may include frequency operators, numbers, and/or time selectors (e.g., hours, days, weeks, etc.). For example, as shown in the example of FIG. 12, a frequency of greater than 5 times within the past 2 days is indicated. Action buttons 1208 may include a reset button that may reset the recency and frequency interface settings to a default setting. Other action buttons (not shown) may include a save button within recency frequency interface 1204 (in addition to the Save/Cancel buttons at the bottom of interface 1200). Estimated historic segment size 1210 is displayed below the trait list. If a change is made to a segment, notification 1212 may be displayed (e.g., as shown, "This segment has changed") along with an action button to Recalculate Size.

Figure 13:
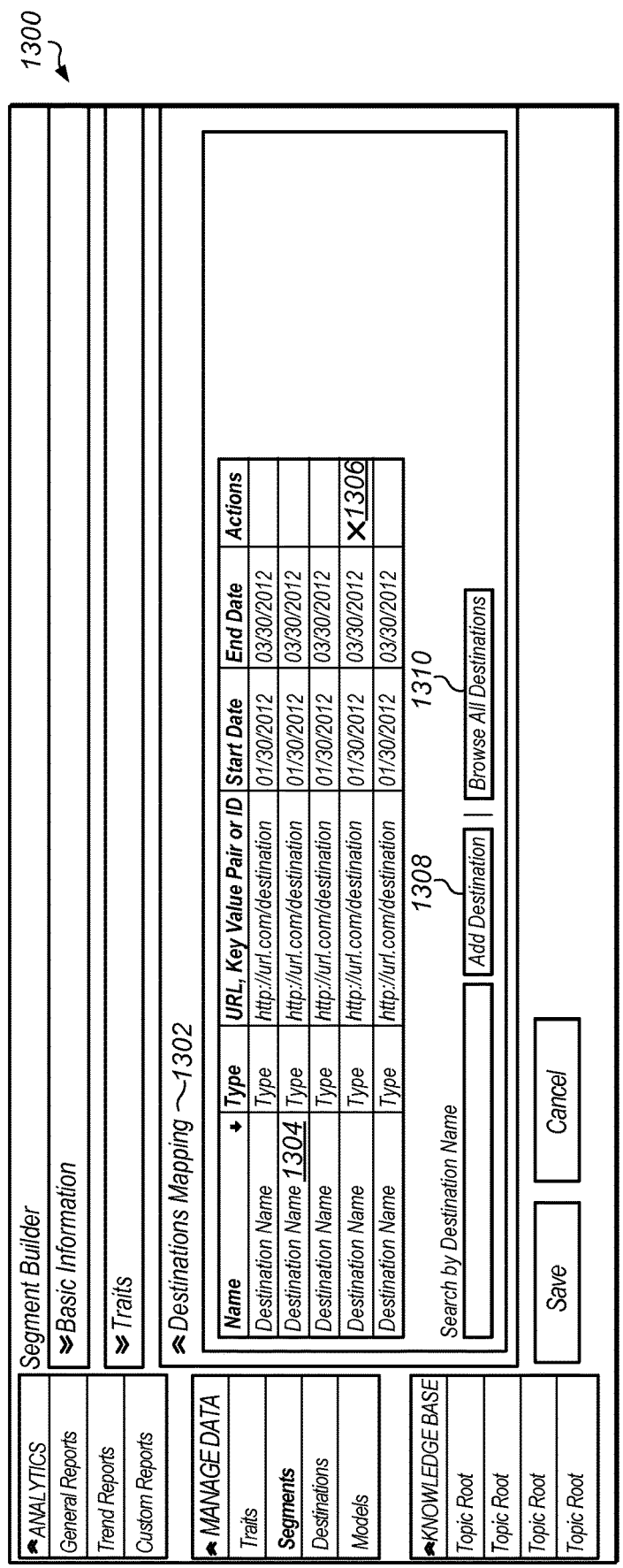

FIG. 13 shows example interface 1300 that illustrates expansion of the Destinations Mapping tab 1302 for an example segment builder application. The destinations are displayed in table format in the illustrated example. In various embodiments, destinations may include a URL, key value pair, and/or ID, as well as a start and end date. Destination name 1304 may be a selectable hyperlink that, upon selection, opens a modal interface containing read-only basic information about the destination. Actions 1306 and 1308 permit a destination to be removed from or added to a segment. Browse All Destinations 1310 is selectable to open a modal interface that includes a list of destinations.

FIG. 14 illustrates a summary view of a segment. Toolbar options 1402 may include Create a New Segment, Edit Segment, Clone Segment, Delete Segment, and/or Share/Print. Basic information entered during segment creation may be displayed in the basic information panel 1404, which may include read-only segment storage path 1406. The summary view may also include a graphical display 1408 that illustrates the number of unique segment visitors at various times (which may represent various length time intervals, such as a 7-day, 30-day, 60-day, etc. time interval). The traits and operators that are used to create the segment may be displayed in trait panel 1410. Trait panel 1410 may include icon 1412 that indicates if recency and frequency rules have been added to a trait or a group of traits. Hovering over icon 1412 (e.g., as shown by the finger pointer) may display a read-only (e.g., not editable within trait panel 1410) summary of the recency-frequency. Selecting a trait name 1414 may take the user to the trait summary interface. Segment traits may be edited by selecting button 1416, which may redirect the user directly to the traits edit interface. Destinations 1420 are displayed and can be edited by selecting Edit Destinations.

FIGS. 15-17 illustrate an example creation of a segment and use of the created segment, according to various embodiments. As shown in FIG. 15, an example interface 1500 is shown, which illustrates the basic information and trait tabs expanded. The segment in the example is named Male Jersey Shore Viewers, is selected as an active segment, with a data source chosen. Data sources may include real-time data sources, offline data sources (e.g., first party offline data, or data from third party data providers), and/or other data sources. As shown, the segment rule includes AND'ing together the trait Male with the traits Video-Generic Video View-Show Title-Jersey Shore and Video-Full Episode Start-Show Title-Jersey Shore. In FIG. 15, because the segment is being created, the size of the segment has not yet been calculated. As shown at 1502, Recalculate Size button 1502 is shown, which may cause the audience size (e.g., last 7 days, 30 days, 60 days, real-time, historic, etc.) of unique visitors that qualify according to the segment rule to be calculated.

FIG. 16 continues upon the example of FIG. 15 and illustrates the calculation of the audience size as shown in example interface 1600. As shown, the last 30 days of unique visitors that qualify for each of the traits is shown as well as the estimated historic segment size for the last 7, 30, and 60 days. Note that in other embodiments, other time ranges may be displayed in addition to, or instead of, the example time ranges shown in FIG. 16.

FIG. 17 illustrates an example of using code view of interface 1700 to define a trait and/or segment, as opposed to the basic view shown in FIG. 15. As shown, code view 1702 illustrates a segment definition using various terms and Boolean operators to define various traits. The segment rule (61405T OR 62727T) AND (67874T OR 71056T) AND NOT (61404T OR 61794T OR (62726T AND 63562T)) is an example of a segment rule and traits defined according to a code view representation. Such a segment rule may represent an equivalent to the rule shown in FIG. 15 or it may be a completely different rule. Note that toggling between the basic view and code view 1702 may toggle the display of the trait and segment rule such that the when basic view is selected, a plain English representation of the segment rule represented by code view 1702 may be shown.

Moreover, for a segment rule defined in the basic view, by selecting code view, the segment rule may be display according to the code view. Code view may include a validate expression button 1704 that is usable to compile and/or otherwise validate that the segment rule and traits are valid. Save/cancel buttons 1706 are usable to save/cancel the code view segment rule. Note that if validate expression 1704 is performed, if the segment rule is validated successfully, the rule may automatically be saved. The other portions of interface 1700 may function in a similar manner as the interface shown in FIGS. 15-16.

FIG. 18 illustrates one embodiment of an interface 1800 configured to display real-time and total segment population numbers for a segment rule that includes by one or more traits. As shown, the estimated historic segment size over the last 30 days indicates 4736 unique visitors that qualify for the segment whereas the real-time segment population indicates 6525 unique visitors over the last 30 days. The total segment population is 8370 unique visitors over the last 30 days. As shown in the example, numbers for the last 7 days and last 60 days are also displayed. Note that in other embodiments, other time ranges may be displayed in addition to, or instead of, the example time ranges shown in FIG. 18. Note that the total segment population minus the real-time segment population yields the number of visitors qualified via the back end component.

Example System

Figure 19:
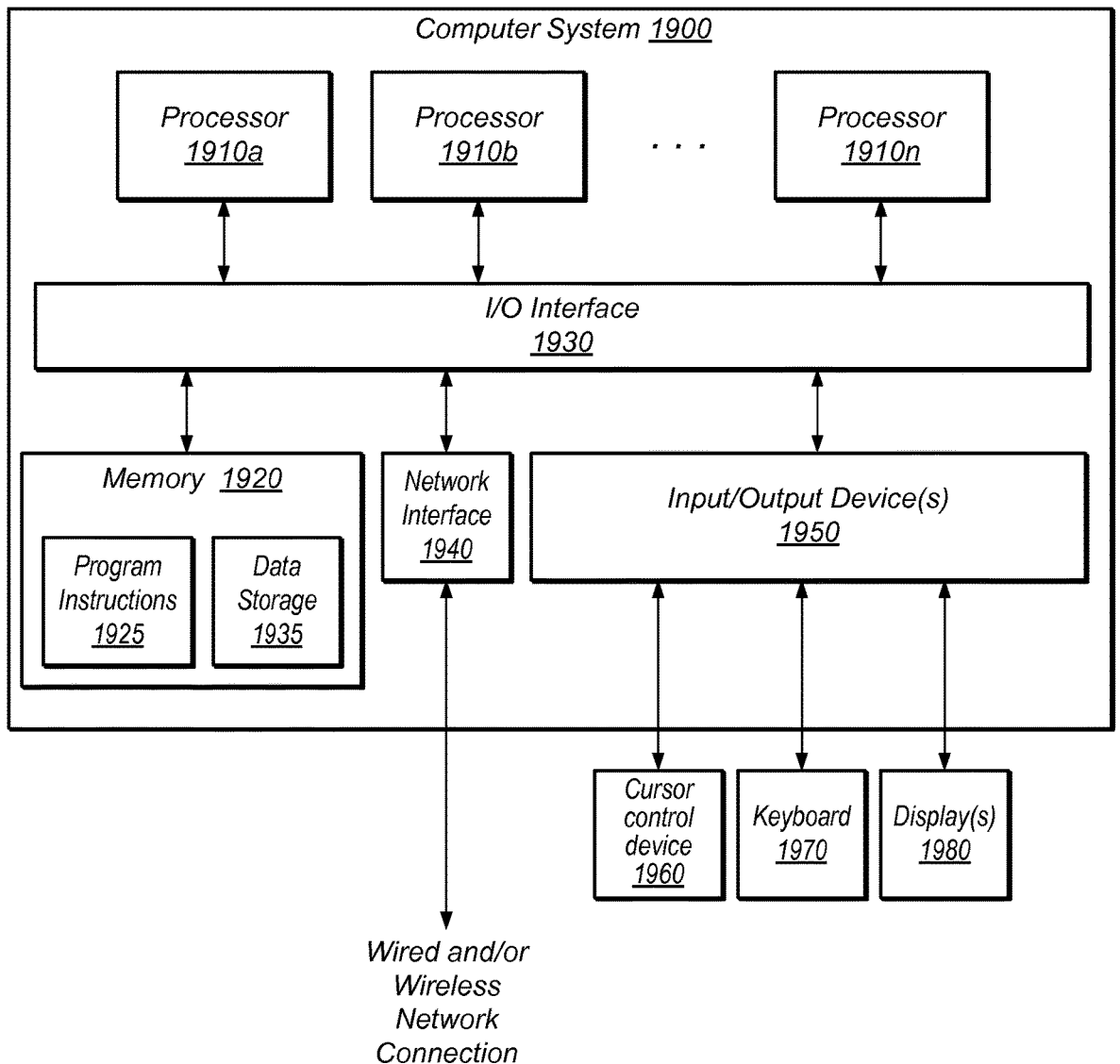
FIG. 19 illustrates an example computer system that may be used in some embodiments.

Embodiments of a segment analysis module and/or of the various disclosed techniques as described herein may be executed on one or more computer systems, which may interact with various other devices. One such computer system is illustrated by FIG. 19. In different embodiments, computer system 1900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, one or more servers, a peripheral device such as a switch, modem, router, or in general any type of computing or electronic device.

In the illustrated embodiment, computer system 1900 includes one or more processors 1910 coupled to a system memory 1920 via an input/output (I/O) interface 1930. Computer system 1900 further includes a network interface 1940 coupled to I/O interface 1930, and one or more input/output devices 1950, such as cursor control device 1960, keyboard 1970, and display(s) 1980. In some embodiments, it is contemplated that embodiments may be implemented using a single instance of computer system 1900, while, in other embodiments, multiple such systems, or multiple nodes making up computer system 1900, may be configured to host different portions or instances of embodiments. For example, in one embodiment some elements may be implemented via one or more nodes of computer system 1900 that are distinct from those nodes implementing other elements.

In various embodiments, computer system 1900 may be a uniprocessor system including one processor 1910, or a multiprocessor system including several processors 1910 (e.g., two, four, eight, or another suitable number). Processors 1910 may be any suitable processor capable of executing instructions. For example, in various embodiments, processors 1910 may be general-purpose or embedded processors implementing any of a variety of instruction set architectures (ISAs), such as the x86, PowerPC, SPARC, or MIPS ISAs, or any other suitable ISA. In multiprocessor systems, each of processors 1910 may commonly, but not necessarily, implement the same ISA.

In some embodiments, at least one processor 1910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1920 may be configured to store program instructions and/or data accessible by processor 1910. In various embodiments, system memory 1920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as the techniques described above are shown stored within system memory 1920 as program instructions 1925 and data storage 1935, respectively. In other embodiments, program instructions and/or data may be received, sent or stored upon different types of computer-accessible media or on similar media separate from system memory 1920 or computer system 1900. Generally speaking, a computer-accessible medium may include storage media or memory media such as magnetic or optical media, e.g., disk or CD/DVD-ROM coupled to computer system 1900 via I/O interface 1930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1940.

In one embodiment, I/O interface 1930 may be configured to coordinate I/O traffic between processor 1910, system memory 1920, and any peripheral devices in the device, including network interface 1940 or other peripheral interfaces, such as input/output devices 1950. In some embodiments, I/O interface 1930 may perform any necessary protocol, timing or other data transformations to convert data signals from one component (e.g., system memory 1920) into a format suitable for use by another component (e.g., processor 1910). In some embodiments, I/O interface 1930 may include support for devices attached through various types of peripheral buses, such as a variant of the Peripheral Component Interconnect (PCI) bus standard or the Universal Serial Bus (USB) standard, for example. In some embodiments, the function of I/O interface 1930 may be split into two or more separate components, such as a north bridge and a south bridge, for example. In addition, in some embodiments some or all of the functionality of I/O interface 1930, such as an interface to system memory 1920, may be incorporated directly into processor 1910.

Network interface 1940 may be configured to allow data to be exchanged between computer system 1900 and other devices attached to a network, such as other computer systems, or between nodes of computer system 1900. In various embodiments, network interface 1940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1950 may, in some embodiments, include one or more display terminals, keyboards, keypads, touchpads, scanning devices, voice or optical recognition devices, or any other devices suitable for entering or retrieving data by one or more computer system 1900. Multiple input/output devices 1950 may be present in computer system 1900 or may be distributed on various nodes of computer system 1900. In some embodiments, similar input/output devices may be separate from computer system 1900 and may interact with one or more nodes of computer system 1900 through a wired or wireless connection, such as over network interface 1940.

As shown in FIG. 19, memory 1920 may include program instructions 1925, configured to implement embodiments of a segment analysis module as described herein, and data storage 1935, comprising various data accessible by program instructions 1925. In one embodiment, program instructions 1925 may include software elements of embodiments of a segment analysis module as illustrated in the above Figures. Data storage 1935 may include data that may be used in embodiments. In other embodiments, other or different software elements and data may be included.

Those skilled in the art will appreciate that computer system 1900 is merely illustrative and is not intended to limit the scope of a segment analysis module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1900 may be transmitted to computer system 1900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A computer-implemented method, comprising:
   providing, by a data management platform, a graphical interface of the data management platform, wherein the graphical interface is executed by a computing device and enables defining segment rules based on code expressions, the graphical interface comprising:
   a first section of the graphical interface, the first section including a set of fields for selecting different web site visitor traits and an interface element for selecting between different operators that apply a set of web site visitor traits in combination; and
   a second section of the graphical interface, the second section configured to display code expressions implementing segment rules;
   receiving, at the first section of the graphical interface, a selection of a web site visitor trait that is descriptive of visitors to at least one web site;
   receiving, by the data management platform, a user input selecting the second section of the graphical interface configured to display code expressions implementing segment rules;
   updating, by the data management platform and responsive to the user input, the graphical interface to display the second section of the graphical interface;
   receiving, at the second section of the graphical interface, input of a code expression;
   creating, by a segment analysis module implemented on the data management platform, a segment rule based on the code expression as input via the second section of the graphical interface, wherein the segment rule defines conditions to qualify visitors to a segment, wherein:
  the segment rule specifies that the conditions are evaluated based on a combined recency and frequency of qualification events together,
  the qualification events are based on collected audience data measuring interactions of a plurality of visitors with the at least one web site,
  the collected audience data is stored at a data store by a back-end component of the data management platform,
  each of the qualification events corresponds to a separate qualification of a respective one of the plurality of visitors according to the web site visitor trait, and
  the segment rule specifies that the conditions are met and that a given visitor qualifies to the segment if the collected audience data indicates that a frequency at which the web site visitor trait was observed for the given visitor exceeds a frequency number over a recency period of time;
evaluating, by a real-time component of the segment analysis module, the combined recency and frequency of the qualification events together according to the segment rule, the evaluating comprising:
  executing a query to the back-end component to apply the segment rule based on the code expression as input via the second section of the graphical interface; and
  qualifying the plurality of visitors to the segment based on execution of the query;
calculating, in real time by the real-time component, an estimated audience size for the at least one web site based on a number of the plurality of visitors qualified to the segment;
evaluating a worth of the segment comprising the plurality of visitors, based on the estimated audience size; and
launching a new outreach campaign directed to the segment based on the worth of the segment.

2. The method of claim 1, wherein said evaluating includes estimating a segment population size in real time, wherein said estimating the segment population size in real time includes using a distributed search cluster service to search the one or more of the qualification events.

3. The method of claim 2, wherein said estimating the segment population size is performed for a time range, wherein said estimating includes evaluating the combined recency and frequency of each qualification event that is within the time range.

4. The method of claim 2, further comprising:
  predicting a future segment population size based on the segment population size estimated.

5. The method of claim 2, wherein the segment population size indicates a number of unique visitors who qualify according to the segment rule.

6. The method of claim 2, further comprising providing the segment population size and other respective segment population sizes for display, wherein the segment population size and each of the other respective segment population sizes correspond to a respective time range of a plurality of time ranges.

7. The method of claim 1, further comprising:
  storing an indication of each of one or more of the qualification events;
  wherein said evaluating includes estimating a segment population size based on the stored indication of each of the one or more of the qualification events.

8. The method of claim 1, further comprising:
  providing an instruction to display an advertisement to a visitor to a web site, wherein said evaluating results in the visitor qualifying for a segment associated with the advertisement.

9. The method of claim 1, further comprising:
  receiving a selection of another web site visitor trait, wherein the other web site visitor trait is also descriptive of visitors to a web site; and
  receiving a selection of an operator for a Boolean expression that includes the web site visitor trait and the other web site visitor trait, wherein said evaluating includes applying the Boolean expression to one or more of the qualification events.

10. The method of claim 1, wherein the segment rule includes an n-level deep Boolean expression.

11. The method of claim 1, wherein each of the one or more qualification events is associated with a time of occurrence of the respective qualification event, wherein each time of occurrence is stored with an indication of the respective qualification event.

12. A non-transitory computer-readable storage medium storing program instructions that, when executed by a data management platform, cause the data management platform to perform operations comprising:
  providing a graphical interface that is executed by a computing device and enables defining segment rules based on code expressions, the graphical interface comprising:
    a first section of the graphical interface, the first section including a set of fields for selecting different web site visitor traits and an interface element for selecting between different operators that apply a set of web site visitor traits in combination; and
    a second section of the graphical interface, the second section configured to display code expressions implementing segment rules;
  receiving, at the first section of the graphical interface, a selection of a web site visitor trait and another web site visitor trait, wherein the web site visitor trait and the other web site visitor trait are descriptive of visitors to at least one web site;
  receiving, at the first section of the graphical interface, a selection of an operator for a set of Boolean expressions, wherein the set of Boolean expressions comprises a Boolean expression that includes the web site visitor trait and the other web site visitor trait;
  updating the graphical interface to display the second section of the graphical interface;
  receiving, at the second section of the graphical interface, input of a code expression;
  creating, by a segment analysis module implemented on the data management platform, a segment rule based on the code expression as input via the second section of the graphical interface, wherein the segment rule is usable to evaluate the set of Boolean expressions as nested Boolean expressions and qualify visitors to a segment, wherein:
    the segment rule specifies, based on the Boolean expression, conditions for evaluation according to a combined recency and frequency of qualification events together, the qualification events are based on collected audience data measuring interactions of a plurality of visitors with the at least one web site, the collected audience data is stored at a data store by a back-end component of the data management platform, each of the qualification events corresponds to a separate qualification of a respective one of the plurality of visitors according to the web site visitor trait or other web site visitor trait, and the segment rule specifies that the conditions are met and that a given visitor qualifies to the segment when the collected audience data indicates that a frequency at which the web site visitor trait was observed for the given visitor exceeds a frequency number over a recency period of time;

providing a real-time component of the segment analysis module and the back-end component of the segment analysis module with access to the code expression;

evaluating, by the real-time component, the qualification events by executing the code expression that represents the segment rule, wherein said evaluating comprises:

executing a query to the back-end component to apply the segment rule based on the code expression as input via the second section of the graphical interface; and qualifying the plurality of visitors to the segment based on execution of the query and the Boolean expression;

calculating, in real time by the real-time component, an estimated audience size for the at least one web site based on a number of the plurality of visitors qualified to the segment;

evaluating a worth of the segment comprising the plurality of visitors, based on the estimated audience size; and launching a new outreach campaign directed to the segment based on the worth of the segment.

13. The non-transitory computer-readable storage medium of claim 12, wherein said evaluating includes estimating a segment population size in real time based on a stored indication of each of the one or more of the qualification events.

14. The non-transitory computer-readable storage medium of claim 13, wherein:

each qualification event is associated with a time of occurrence of the qualification event;

each time is stored with an indication of the qualification event;

said estimating the segment population size is performed for a time range; and said estimating includes evaluating the time of occurrence of each qualification event that is within the time range.

15. The non-transitory computer-readable storage medium of claim 12, wherein the program instructions are further computer-executable to implement:

providing an instruction to display an advertisement to a visitor to a web site, wherein said evaluating results in the visitor qualifying for a segment associated with the advertisement.

16. The non-transitory computer-readable storage medium of claim 12, wherein said evaluating includes determining a combined recency and frequency of at least one of the web site visitor trait or the other web site visitor trait.

17. A system, comprising:

a data management system having at least one processing device that is configured to:

provide a graphical interface that enables defining segment rules based on code expressions, the graphical interface comprising:

a first section of the graphical interface, the first section including a set of fields for selecting different web site visitor traits and an interface element for selecting between different operators that apply a set of web site visitor traits in combination; and a second section of the graphical interface, the second section configured to display code expressions implementing segment rules;

receive, at the first section of the graphical interface, a selection of a web site visitor trait that is descriptive of visitors to at least one web site;

update the graphical interface to display the second section of the graphical interface;

receive, at the second section of the graphical interface, input of a code expression; and create, by a segment analysis module implemented on the system, a segment rule based on the code expression as input via the second section of the graphical interface, wherein the segment rule defines conditions to qualify visitors to a segment, wherein:

the segment rule specifies that the conditions are evaluated based on a combined recency and frequency of qualification events together, the qualification events are based on collected audience data measuring interactions of a plurality of visitors with the at least one web site, each of the qualification events corresponds to a separate qualification of a respective one of the plurality of visitors according to the web site visitor trait, and the segment rule specifies that the conditions are met and that a given visitor qualifies to the segment when the collected audience data indicates that a frequency at which the web site visitor trait was observed for the given visitor exceeds a frequency number over a recency period of time;

a back-end component comprising a first cluster of computing devices and a distributed data store, wherein the back-end component is configured to:

store the collected audience data in the distributed data store; and service queries by applying, with the first cluster of computing devices, the segment rule to the collected audience data in the distributed data store; and a real-time component comprising a second cluster of computing devices, wherein the real-time component is configured to:

execute a query to the back-end component to apply the segment rule based on the code expression as input via the second section of the graphical interface;

qualify the plurality of visitors to the segment based on execution of the query; and calculate, in real time, an estimated audience size for the at least one web site based on a number of the plurality of visitors qualified to the segment;

wherein the data management system is further configured to:

evaluate a worth of the segment comprising the plurality of visitors, based on the estimated audience size; and launching a new outreach campaign directed to the segment based on the worth of the segment.

18. The system of claim 17, wherein said evaluating includes estimating a segment population size based on a stored indication of each of the one or more qualification events.

19. The system of claim 18, wherein each qualification event is associated with a time of occurrence of the qualification event, wherein:
- each time is stored with an indication of the qualification event;
- said estimating the segment population size is performed for a time range; and
- wherein said estimating includes evaluating the time of occurrence of each qualification event that is within the time range.

20. The system of claim 17, wherein the at least one processing device is further configured to:
- receive a selection of another web site visitor trait, wherein the other web site visitor trait is also descriptive of visitors to a web site; and
- receive a selection of an operator for a Boolean expression that includes the web site visitor trait and the other web site visitor trait, wherein said evaluating includes applying the Boolean expression to one or more of the qualification events.

* * * * *